(12) United States Patent
Karmoose et al.

(10) Patent No.: US 12,556,325 B2
(45) Date of Patent: Feb. 17, 2026

(54) DMRS BUNDLING SCHEMES FOR UPLINK NON-CODEBOOK TRANSMISSIONS

(71) Applicant: Samsung Electronics Co., Ltd., Gyeonggi-do (KR)

(72) Inventors: Mohammed Karmoose, San Diego, CA (US); Jung Hyun Bae, San Diego, CA (US); Yaser Mohamed Mostafa Kamal Fouad, San Diego, CA (US); Hamid Saber, San Diego, CA (US); Jungwon Lee, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 17/366,780

(22) Filed: Jul. 2, 2021

(65) Prior Publication Data

US 2022/0045813 A1 Feb. 10, 2022

Related U.S. Application Data

(60) Provisional application No. 63/138,160, filed on Jan. 15, 2021, provisional application No. 63/089,327, filed on Oct. 8, 2020, provisional application No. 63/061,965, filed on Aug. 6, 2020.

(51) Int. Cl.
| | | |
|---|---|---|
| *H04W 52/24* | (2009.01) | |
| *H04B 7/0456* | (2017.01) | |
| *H04L 5/00* | (2006.01) | |
| *H04W 72/1268* | (2023.01) | |
| *H04W 72/23* | (2023.01) | |

(52) U.S. Cl.
CPC ......... *H04L 5/0048* (2013.01); *H04B 7/0456* (2013.01); *H04W 52/242* (2013.01); *H04W 72/1268* (2013.01); *H04W 72/23* (2023.01)

(58) Field of Classification Search
CPC ... H04B 7/0456; H04L 5/0048; H04L 5/0051; H04W 52/242; H04W 52/325; H04W 72/1268; H04W 72/23
See application file for complete search history.

(56) References Cited

U.S. PATENT DOCUMENTS

| | | | |
|---|---|---|---|
| 2021/0014095 A1* | 1/2021 | Ly | H04W 72/23 |
| 2022/0416856 A1* | 12/2022 | Yu | H04B 7/0639 |
| 2023/0076139 A1* | 3/2023 | Muruganathan | H04L 5/0048 |

OTHER PUBLICATIONS

3rd Generation Partnership Project; Technical Specification Group Radio Access Network; NR; Physical layer procedures for data (Release 16) (Jun. 2020).

* cited by examiner

*Primary Examiner* — Harry H Kim
*Assistant Examiner* — M Mostazir Rahman
(74) *Attorney, Agent, or Firm* — The Farrell Law Firm, P.C.

(57) ABSTRACT

Methods and apparatuses are provided for configured grant (CG) type 1 (CG1)-physical uplink shared channel (PUSCH) transmission. A method includes a user equipment (UE) determining, based on a sounding reference signal (SRS) resource indicator (SRI), a precoding matrix for a CG1-PUSCH transmission, processing a demodulation reference signals (DMRS) using the determined precoding matrix; and transmitting the processed DMRS across bundled DMRS resources of a set of CG1-PUSCHs.

12 Claims, 23 Drawing Sheets

DMRS BUNDLING SCHEMES FOR UPLINK NON-CODEBOOK TRANSMISSIONS

PRIORITY

This application is based on and claims priority under 35 U.S.C. § 119(e) to U.S. Provisional Patent Application Nos. 63/138,160, 63/089,327, and 63/061,965, which were filed in the United States Patent and Trademark Office on Jan. 15, 2021, Oct. 8, 2020, and Aug. 6, 2020, respectively, the entire content of each of which is incorporated herein by reference.

FIELD

The present disclosure relates generally to demodulation reference signals (DMRSs) bundling schemes for uplink (UL) non-codebook (NCB) transmissions, and more particularly, to a framework in New Radio (NR), which allows DMRS bundling to be performed among a set of physical UL shared channels (PUSCHs).

BACKGROUND

Rel-16 NR allows for the scheduling of one or more PUSCH transmissions, where the PUSCHs may carry the same or different transport blocks (TBs). Normally, a PUSCH consists of a transmission of a DMRS, which allows a base station or Node B, e.g., a gNB, to perform channel estimation prior to attempting to decode the PUSCH.

Although the gNB may use DMRS signals allocated within PUSCH resources for channel estimation associated with the decoding of the PUSCH, in Rel-16 NR, however, there are no constraints on the configuration and transmission of the PUSCHs in such a way that allows the gNB to jointly use the DMRS resources of all of these PUSCHs to enhance the channel estimation procedure. This operation of joint usage of DMRS resources from different PUSCHs is referred to herein as DMRS bundling. Accordingly, a need exists for efficient mechanisms and procedures to facilitate DMRS bundling among PUSCHs.

SUMMARY

Accordingly, the present disclosure is designed to address at least the problems and/or disadvantages described above and to provide at least the advantages described below.

An aspect of the disclosure is to provide a framework in NR, which allows DMRS bundling to be performed among a set of PUSCHs.

Another aspect of the disclosure is to provide a mechanism for determining a precoding matrix for a configured grant (CG) type 1 (CG1)-PUSCH.

Another aspect of the disclosure is to provide a mechanism for maintaining conditions for power consistency across bundled DMRS resources.

Another aspect of the disclosure is to provide a mechanisms for DMRS bundling configurations for CG1-PUSCHs, CG type 2 (CG2)-PUSCHs, dynamic grant (DG)-PUSCHs, or standalone configurations.

Another aspect of the disclosure is to provide a mechanism for configuring a sounding reference signal (SRS) and a channel-state information (CSI)-reference signal (RS) to be used for an NCB PUSCH with bundled DMRS resources.

Another aspect of the disclosure is to provide a mechanism for configuring quiet periods associated with an SRS and a CSI-RS used for an NCB PUSCH with bundled DMRS resources.

Another aspect of the disclosure is to provide a mechanisms for handling different types of cancelation indications, e.g., a cancelation indicator (CI), a slot format indicator (SFI), a conflict with another UL signal having a higher priority, etc., during PUSCH transmissions with bundled DMRS resources.

In accordance with an aspect of the disclosure, a method, performed by a user equipment (UE), is provided for configured grant (CG) type 1 (CG1)-physical uplink shared channel (PUSCH) transmission. The method includes determining, based on a sounding reference signal (SRS) resource indicator (SRI), a precoding matrix for a CG1-PUSCH transmission; processing a demodulation reference signals (DMRS) using the determined precoding matrix; and transmitting the processed DMRS across bundled DMRS resources of a set of CG1-PUSCHs.

In accordance with another aspect of the disclosure, a user equipment (UE) is provided, which includes a transceiver; and a processor configured to determine, based on a sounding reference signal (SRS) resource indicator (SRI), a precoding matrix for a configured grant (CG) type 1 (CG1)-physical uplink shared channel (PUSCH) transmission, process a demodulation reference signals (DMRS) using the determined precoding matrix, and transmit, via the transceiver, the processed DMRS across bundled DMRS resources of a set of CG1-PUSCHs.

In accordance with another aspect of the disclosure, a method, performed by a Node B, is provided for receiving a configured grant (CG) type 1 (CG1)-physical uplink shared channel (PUSCH) transmission from a user equipment (UE). The method includes transmitting a sounding reference signal (SRS) resource indicator (SRI) to the UE, wherein the UE determines a precoding matrix for a CG1-PUSCH transmission based on the SRI; and receiving, from the UE, a demodulation reference signals (DMRS) across bundled DMRS resources of a set of CG1-PUSCHs, wherein the DMRS is process by the UE using the determined precoding matrix.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
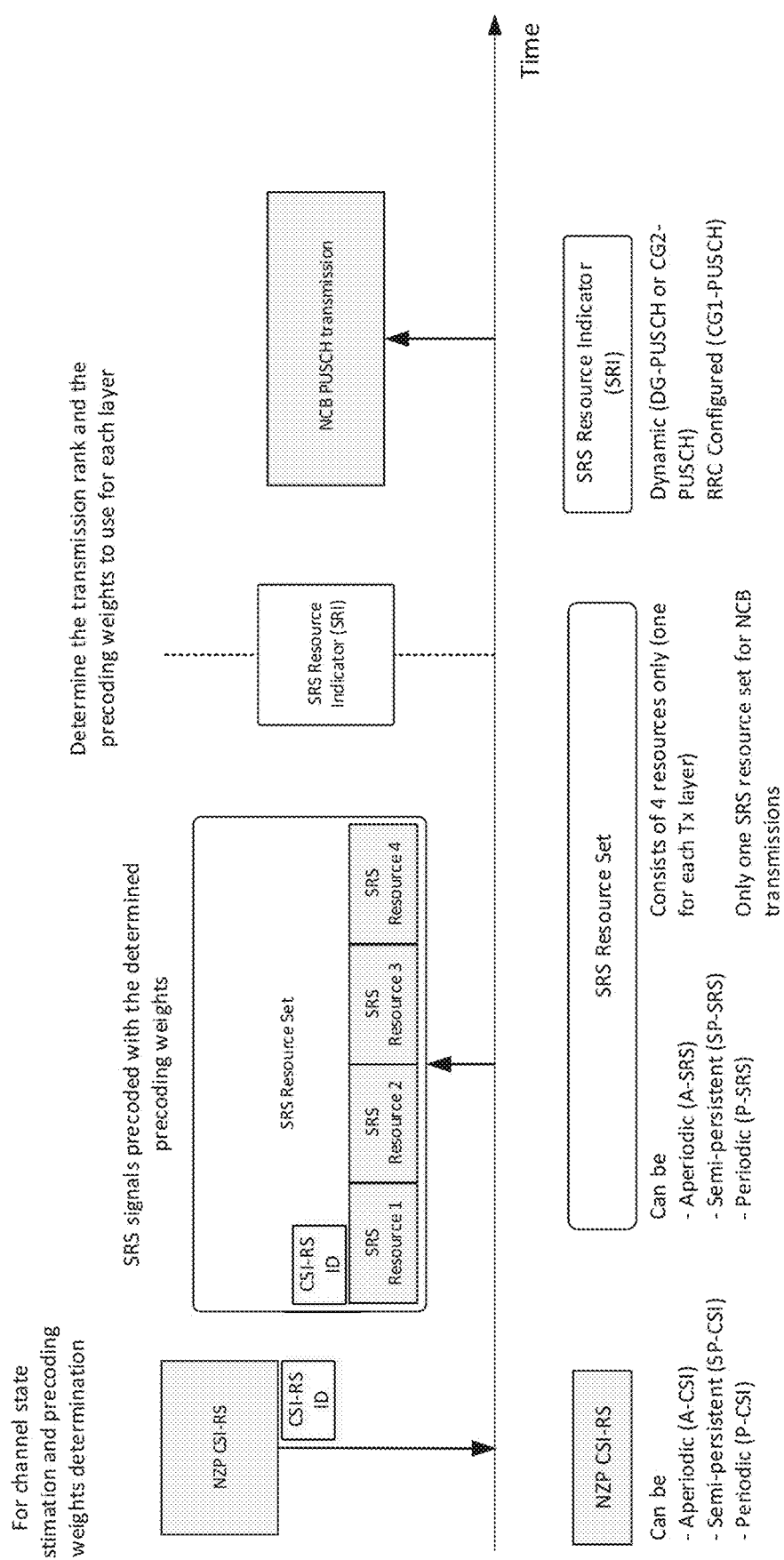
FIG. 1 illustrates an example of an NCB PUSCH transmission as per the Rel-16 specification.

Hereinafter, various embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$", "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, a module may be implemented in a form of an application-specific integrated circuit (ASIC).

Generally, a user equipment (UE) determines precoding to be applied for layers of a PUSCH. For example, a UE is configured with up to 4 SRS resources (all within one configured SRS Resource Set), where each SRS resource corresponds to a transmission layer. If channel reciprocity is assumed (e.g., time division duplexing (TDD)), the UE first uses CSI-RS signals to determine downlink (DL) and UL channels and therefore determine precoding weights.

Thereafter, the UE sends, to a gNB, the SRS resources, where one SRS resource is configured with one particular precoding weights set. The UE then determines 1) the number of layers for the PUSCH, and 2) which precoding to use for each layer. Determining these two items may depend on the scheduling mechanism:

For dynamic scheduling, the number of layers and which SRS resource to use corresponding to each layer is based on feedback from the gNB. The feedback is given in the scheduling PDCCH using DL control information (DCI) 0_1 or 0_2. These DCI formats contain an srs-ResourceIndicator field, which specifies which SRS resources are to be considered when precoding the scheduled PUSCH. The number of layers corresponds to the number of indicated SRS resources, and the precoding to be used for each layer corresponds to the precoding used for each SRS resource.

For CG type 1 (with no activation), the number of layers and which SRS resource to use is radio resource control (RRC) configured, which means that the number of layers and the correspondence with SRS resources is RRC configured, such that it is the same for all PUSCHs transmitted using CG type 1.

For CG type 2 (with activation), the number of layers and which SRS resource to use is indicated in an activating physical DL control channel (PDCCH), similar to dynamic scheduling.

When performing NCB PUSCH transmission, a UE computes a precoding matrix to use based on the channel. In performing NCB PUSCH, channel reciprocity can be assumed between the gNB and the UE. Therefore, the UE uses CSI-RS resources to determine the channel between the gNB and UE and then compute the appropriate precoding matrix.

Specifically, for an SRS resource set configured with a usage to be NCB (referred to herein as "a NCB SRS resource set"), exactly one associated non-zero power (NZP) CSI-RS resource is associated with the NCB SRS resource set. The UE can then use this NZP CSI-RS resource for determining the channel between the gNB to the UE, and then precode the SRS resources in the NCB SRS resource set. The NZP CSI-RS resource is RRC configured via an information element (IE) configuring the NCB SRS resource set (e.g., through csi-RS, if the NCB SRS resource set is an aperiodic (A)-SRS, or associatedCSI-RS, if it is a periodic/semi-persistent (P/SP)-SRS).

FIG. 1 illustrates an example of an NCB PUSCH transmission as per the Rel-16 specification.

For a meaningful DMRS bundling application in a process of channel estimation (CE), a UE should maintain the same precoding matrix across bundled DMRS symbols. Rel-16 specifies that, when an SRS resource indicator (SRI) is indicated to the UE via a PDCCH, such as in a DG-PUSCH and a CG2-PUSCH, the UE uses a DMRS precoding that was used in precoding the latest instance of the SRS resources indicated by the SRI in the PDCCH. However, no such statement exists regarding the DMRS precoding of CG1-PUSCH.

In Rel-16, it is also worth noting that exactly one SRS resource set is configured for an NCB PUSCH. The SRS resource set contains at most 4 SRS resources. This resource set is used by any NCB PUSCH. Based on these parameters of Rel-16, how DMRS bundling for K slots can be applied in Rel-16 and possible shortcomings thereof are described below.

A common shortcoming associated with DMRS bundling is that a UE is forced to use the same precoding for a series of transmissions, during which a more up-to-date SRS information may be available and ready to use. This shortcoming, however, is fairly fundamental for DMRS bundling, and therefore, is not described in more detail herein.

TABLE 1

Feasibility of DMRS bundling in Rel-16

| | A-SRS | | P-SRS | | SP-SRS | |
|---|---|---|---|---|---|---|
| | Feasibility | Shorcomina | Feasibility | Shortcomingsi | F easibility | Shoricomina |
| DG PUSCH CG2-PUSCH | Feasible for any value of K | | Feasible for any value of K | Possible waste of resources from unused SRS transmissions | Feasible for any value of K | Possible waste of resources from SRS unused transmissions |
| CG1-PUSCH | Lack of specification for UE behaviour for precoding determination Feasible for any value of K | | Lack of specification for UE behaviour for precoding determination The value of K depends on the relative periodicity configuration of CG and SRS | the | Lack of specification for UE behaviour for precoding determination The value of K depends on relative periodicity configuration of CG and SRS | |

DG-PUSCH and CG2-PUSCH

In DG-PUSCH and CG2-PUSCH, a UE initiates PUSCH transmission based on a scheduling/activating PDCCH, which explicitly ties the UE to use a precoding matrix corresponding to a latest SRS transmission before the PDCCH. With this explicit UE behavior, a gNB is ensured that DMRS bundling is possible among the PUSCHs scheduled/activated by the same PDCCH. This mechanism allows DMRS bundling for any value of K. However, a shortcoming here is that the coupling of the UE with respect to the last SRS before the corresponding PDCCH may force the UE to use an outdated precoding matrix, especially for large values of K. This behavior is valid for any configuration of SRS. However, for P-SRS and SP-SRS, it is also possible that many SRS transmissions occur during the K scheduled PUSCHs with no precoding change, and therefore, no utilization of these SRS transmissions for these PUSCHs. This is essentially a waste of resources.

Figure 2:
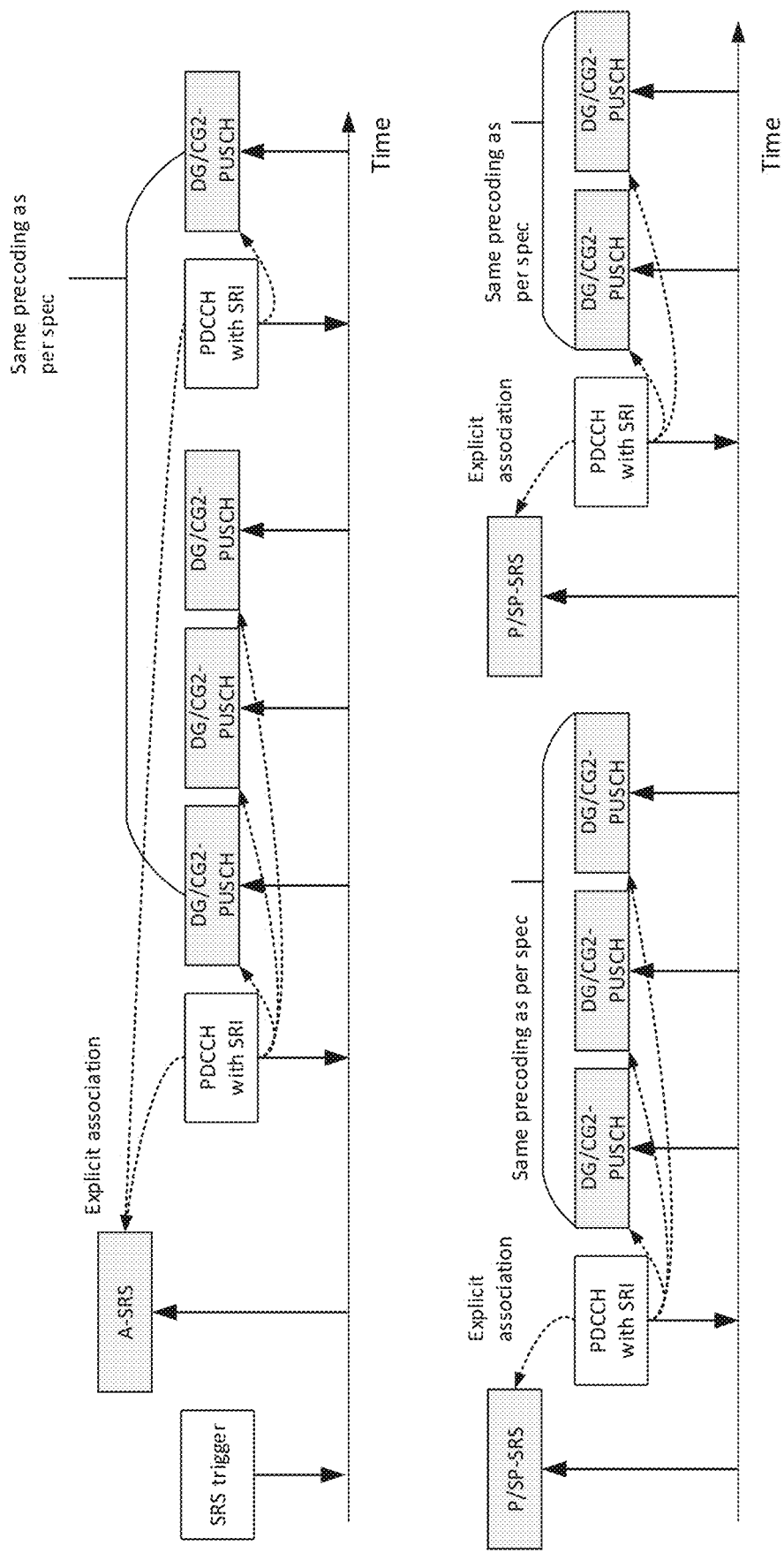
FIG. 2 illustrates a procedure of an NCB DG/CG2-PUSCH transmission using an A-SRS and a P/SP-SRS.

FIG. 2 illustrates a procedure of an NCB DG/CG2-PUSCH transmission using an A-SRS and a P/SP-SRS.

CG1-PUSCH

For CG1-PUSCH, a UE is not mandated to use the latest SRS before the SRI-carrying PDCCH since there is no such thing. This is a possible shortcoming for all CG1-PUSCH transmissions. The UE has the freedom to choose a precoding matrix, which can possibly change for each CG1-PUSCH transmission. However, this does not prevent the UE from maintaining the use of the same precoding matrix across many transmissions. In fact, a logical choice of a precoding matrix would be to use the precoding matrix used in association with the latest SRS transmission.

Figure 3:
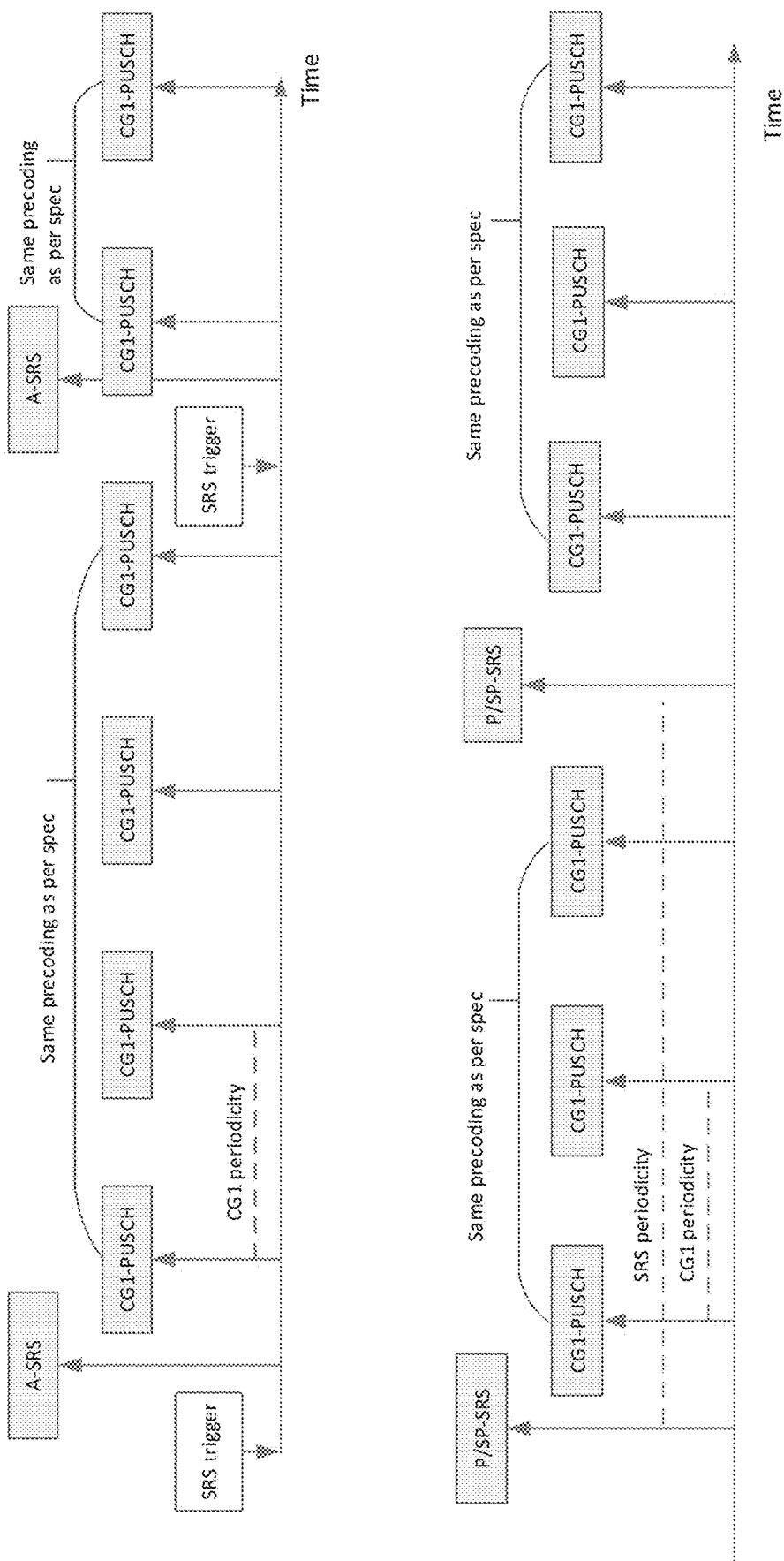
FIG. 3 illustrates use of an A-SRS and a P/SP-SRS for precoding determination in an NCB CG1-PUSCH transmission.

FIG. 3 illustrates use of an A-SRS and a P/SP-SRS for precoding determination in an NCB CG1-PUSCH transmission.

More specifically, FIG. 3 shows how precoding determination works for an NCB CG1-PUSCH transmission. In such case, the feasibility of DMRS bundling depends on the SRS configuration:

For an A-SRS, to allow DMRS bundling of K CG1-PUSCH transmissions, a gNB can simply request an SRS transmission before a first transmission of the K PUSCHs to be bundled.

For a P-SRS and an SP-SRS, locations of possible SRS transmissions are pre-configured. Therefore, assuming that a precoding matrix in association with a latest SRS transmission is used as described above, for a set of K CG1-PUSCH transmissions, to allow DMRS bundling among them, the K CG1-PUSCH transmissions should coincide between two P/SP-SRS transmissions. This is a function of the periodicity configurations of the CG1-PUSCH and the P/SP-SRS, and therefore, there is a limitation on the achievable bundling length K.

A UE determines the precoding to be used on SRS resources in an NCB SRS resource set using associated NZP CSI-RS resources. The CSI-RS resource can be aperiodic (referred to herein as "A-CSI"), semi-persistent (referred to herein as "SP-CSI") or periodic (referred to herein as "P-CSI"). Therefore, the UE behavior in determining the precoding to be used may be affected by a combination of the triggering mechanisms for the SRS and the associated CSI-RS.

Rel-16 does not preclude any of the listed combinations of triggering mechanisms. In addition, Rel-16 provides the following details when a UE is configured with A-SRS resources associated with A-CSI resources:

An SRS request trigger also triggers the corresponding NZP CSI-RS resource. It is transmitted in the same slot as a PDCCH carrying the SRS request.

If a gap between the SRS transmission and the CSI-RS reception is less than 42 orthogonal frequency division multiplexing (OFDM) symbols, the UE is not expected to update the precoding of the SRS transmission based on the CSI-RS.

In view of the foregoing, various embodiments of the disclosure are described below, which provide, among other things, 1) methods for configuring a UE to perform DMRS bundling among different PUSCHs, 2) methods for determining and controlling the use of precoding matrices when performing DMRS bundling, and 3) enhancements related to use of an SRS-RS and a CSI-RS associated with an NCB PUSCH with DMRS bundling.

Determination of Precoding Matrix for CG1-PUSCH

Controlling the precoding used for an NCB PUSCH transmission over bundled slots is an import aspect for joint DMRS channel estimation. Accordingly, a clear mechanism should be developed to ensure that a UE is using suitable precoding over a bundled NCB PUSCH.

The current specification in Rel-16 specifies the following:

The indicated SRI in slot n is associated with the most recent transmission of SRS resource(s) identified by the SRI, where the SRS transmission is prior to the PDCCH carrying the SRI.

The aforementioned statement provides an explicit association of the precoding used for NCB DG/CG2-PUSCHs with the last SRS used, prior to a scheduling/activating PDCCH. However, a similar statement does not exist for an NCB CG1-PUSCH, which does not have an associated PDCCH.

Similar to Rel-16 behavior with respect to DG-PUSCH and CG2-PUSCH, a UE scheduled for a CG1-PUSCH transmission may be configured to use a precoding matrix corresponding to the latest SRS resources with an SRI matching those configured for the scheduled PUSCHs to be bundled. As described above, this provides a gNB with an unambiguous description of the UE choice of precoding matrices.

Alternatively, the UE may be configured to use a specific transmitted instance of SRS resources among the previously transmitted instances of the SRS resource (not necessarily the latest one). The UE may receive an indication of an SRI, which indicates which SRS resources are associated with the bundled PUSCHs, and also of which specific SRS resource to use among the previously transmitted instances. In accordance with an embodiment of the disclosure, a mechanism is described below to allow for such an indication.

Contrary to Rel-16, a UE may be configured with two or more NCB SRS resource sets. In this case, determining the precoding matrix requires an indication of an SRI, and also which NCB SRS resource set to use. In accordance with an embodiment of the disclosure, a method is described below for configuring multiple SRS resource sets.

Power Consistency Across Bundled DMRS Resources

When a UE performs DMRS bundling across DMRS resources of a set of PUSCHs, the UE should maintain the same transmission power across those bundled DMRS resources. A UE typically determines the transmission power of a PUSCH based on a path loss (PL) estimation performed by the UE. In order for the UE to maintain the same transmission power across the bundled DMRS resources, one or more of the following mechanisms may be utilized.

1. A UE can set the transmission power to be used across all PUSCHs with the bundled DMRS based on the same PL value. This PL value can be estimated using the latest reference signal received by the UE before the set of PUSCHs with the bundled DMRS resources.

2. A gNB can ensure to use the same transmit power control (TPC) values for all scheduled PUSCHs with the bundled DMRS resources.

3. To regulate how a UE behaves with respect to TPC commands, the UE may be indicated to ignore specific TPC commands, except for TPC commands that are received in a certain way. For example, only TPC commands that are indicated by particular DCI formats or scheduling PUSCHs of particular kinds may apply.

4. A UE can assume the same PL value for determining the transmission power of all PUSCHs which do not have RS signals for estimating PL in-between.

DMRS Bundling Configuration Schemes

A UE may be configured to perform DMRS bundling among PUSCH transmissions of the same type, e.g., DG-PUSCH, CG1-PUSCH, or CG2-PUSCH. Alternatively, the UE may be configured to perform DMRS bundling among PUSCHs of different types.

From a high level, DMRS bundling utilizes the fact that there is a certain level of time/frequency correlation among channel state information of nearby resource elements (REs). Due to this effect, the DMRS resources of bundled PUSCHs can be collectively used to improve the channel estimation quality of REs. Based on this, a bundling unit may be defined as a set of consecutive (in time and frequency) REs, where any DMRS resource in the bundling unit can be used for the channel estimation of any other RE in the bundling unit. Therefore, the PUSCHs within a bundling unit can have bundled DMRS resources. Within bundled DMRS resources in the bundling unit, the UE maintains the use of the same precoding matrix and the same transmission power, and maintains phase coherence across the bundled DMRSs.

For example, two different approaches are described below for providing DMRS bundling configurations and bundling units.

The first approach is a PUSCH-based approach, which determines the set of PUSCHs with bundled DMRS resources by specifying a total number of consecutive PUSCHs (referred to by the parameter K herein) to be included in the set. This approach allows the bundling of PUSCHs that are not necessarily confined to a particular time duration, e.g., the bundled PUSCHs can be separated by any number of slots. The bundling unit here is determined based on the allocation of PUSCHs with bundled DMRS resources.

In the second approach, the DMRS bundling configuration is time-based, and is determined by the use of a particular duration (referred to by the parameter P herein). In this approach, DMRS bundling can only occur within PUSCHs that are confined to this duration. The rationale behind this approach is that, based on the time correlation of the channel, the channel coefficients that are obtained within the duration P are likely highly correlated, which implies a bundling unit duration. The bundling unit can be semi-statically configured, or changed as frequently as the time correlation of the channel changes.

Additionally, a combination approach may be utilized, where the DMRS bundling configuration can be a combination of PUSCH-based parameters/configurations and time-based parameters/configurations.

Bundling Configuration for CG1

For a CG1-PUSCH transmission with DMRS bundling, a UE may be provided with information to perform DMRS bundling among CG1-PUSCHs via an RRC configuration. For example, ConfiguredGrantConfig can be augmented with parameter(s) that indicate which PUSCH transmissions are DMRS-bundled. A configuration may indicate that each K CG1-PUSCH transmissions have bundled DMRS resources.

Alternatively, using a bundling unit approach, bundling may be performed with a certain periodicity Q (i.e., bundling is allowed every Q slots) and the duration of the DMRS bundling is P (i.e., DMRS bundling is applied among P transmissions/P slots). In addition, such DMRS bundling can be dynamically enabled/disabled using certain signaling from a gNB. For example, dedicated signaling may be used, or an enable/disable instruction may be piggybacked on previous transmissions.

Figure 4:
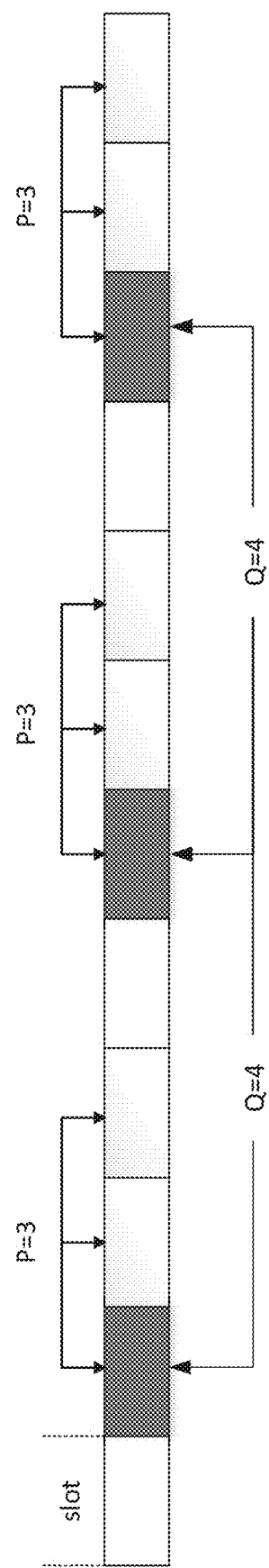
FIG. 4 illustrates a bundling configuration for a CG1 DMRS, according to an embodiment.

FIG. 4 illustrates a bundling configuration for a CG1 DMRS, according to an embodiment.

Bundling Configuration for CG2

Similar to CG1, CG2 uses an identical RRC configuration to configure DMRS bundling. Alternatively, a gNB may include some RRC-configured information in an activating PDCCH. The gNB can also allow enabling/disabling of DMRS bundling through a dedicated indication via the activating PDCCH.

Bundling Configuration for DG

For DG-PUSCH, a gNB can indicate bundling information (e.g., a bundling length, SRS resources to use for precoding matrix computation, etc.) via a PDCCH. Alternatively, the gNB can RRC configure such information (or part of it) on a UE side, while indicating an enabling/disabling of DMRS bundling (along with other information) in a scheduling PDCCH.

Examples of DG-PUSCH configurations are provided below. Additionally, different combinations of the DG-PUSCH configurations described below may be used whenever possible.

DMRS bundling can be enabled over PUSCH repetitions. In this case, the scheduling PDCCH can be used to indicate information to the UE. Alternatively, RRC may be used to configure that scheduled PUSCHs with repetition/aggregation are transmitted with DMRS bundling. RRC can also be used to configure that up to K PUSCH repetitions are DMRS bundled, and in case more repetitions are scheduled, they do not have bundled DMRS resources. Alternatively, each K consecutive repetitions can be configured to be DMRS bundled, such that, if K'>K repetitions are configured, they are split into sets of K transmissions and each set has DMRS bundled resources.

DMRS bundling can be enabled over PUSCHs with different TBs. In this case, the first scheduling PDCCH can be used to indicate the necessary information to the UE. For example, the first scheduling PDCCH can indicate a total number K of PUSCHs to be DMRS bundled. In this case, the UE uses the same precoding matrix for the PUSCH corresponding to this PDCCH, along with the next K−1 PUSCHs that follow.

The application of DMRS bundling here may be confined to the next K PUSCHs having certain properties, e.g., the PUSCHs belong to a particular frequency range (possibly the same range of the first PDCCH). This gives a gNB the capability to schedule non-DMRS-bundled PUSCHs in between the bundled ones (by depriving them of some of these properties). These properties can be RRC configured, e.g., it can be RRC configured that the bundled PUSCHs must belong to the same set of RBs. Alternatively, these properties can be dynamically indicated.

The PDCCH can include a DMRS bundling duration in which any PUSCH transmission is DMRS bundled. This duration can be dynamically indicated in the PDCCH or RRC configured with enabling indication being dynamically scheduled.

Alternatively, the information described in the two examples above can be RRC configured, with the scheduling PDCCH carrying an activation indication for DMRS bundling.

DMRS bundling can be configured by indicating a periodicity Q and a period P that are RRC configured. These values indicate possible locations in time where DMRS bundling can be used. Transmitted DG-PUSCHs during these possible locations of DMRS bundling would then have bundled DMRS resources. A gNB can also be selective in choosing which DG-PUSCHs in those periods are to be DMRS bundled, by allowing the scheduling PDCCH to carry an indication that the scheduled PUSCH is considered in the bundling phase.

A similar idea may be applied to PUSCHs with certain properties, i.e., only certain PUSCHs within the bundling duration may be DMRS bundled.

Standalone Bundling Configuration

To enable DMRS bundling across PUSCHs of different types, a standalone DMRS configuration can be configured at a UE, which is independent of specific configurations associated with DG/CG1/CG2-PUSCHs. One such idea is to configure the UE with a configuration that specifies DMRS bundling durations. When specified, a duration may indicate that any PUSCH transmissions happening within the duration are to be DMRS bundled.

An example of such DMRS bundling configuration includes a configuration with a periodicity Q and a bundling duration P.

Q indicates the periodicity (e.g., in terms of slots or subframes) of the initiation of DMRS bundling. The value of Q specifies the period of the slots of the first PUSCH where DMRS bundling can be applied.

P indicates the duration of DMRS bundling, starting from the slots indicated by the period Q. The duration can be considered by the UE and gNB to be in terms of slots or in terms of PUSCHs. The used interpretation can be indicated in the bundling configuration.

Figure 5:
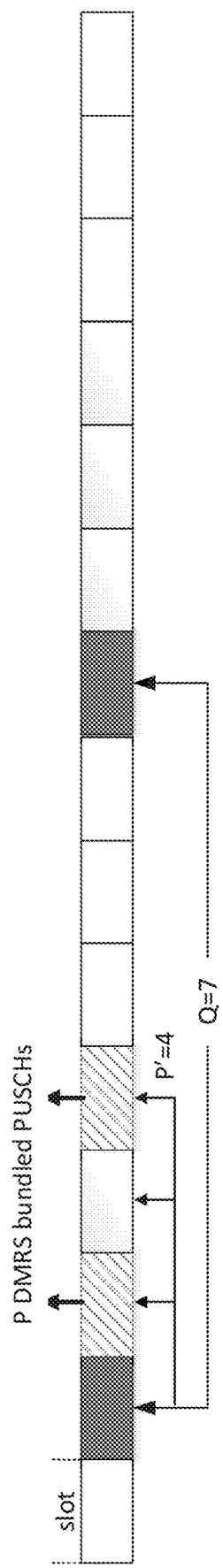
FIG. 5 illustrates the use of P and P' in configuring DMRS bundling, according to an embodiment.

If P is defined in terms of slots, DMRS bundling may occur between the PUSCHs happening within P consecutive slots starting by the initial slot indicated by the period Q. The actual number of PUSCHs with bundled DMRSs can be P (corresponding to a PUSCH in each slot) or less than P (if the actual scheduled PUSCHs within those P slots are less). This case is illustrated in FIG. 5.

FIG. 4 also illustrates a DMRS bundling configuration that may be used for a DG-PUSCH using periodicity and duration, according to an embodiment.

If P is in terms of PUSCH transmissions, this means that bundling happens within P consecutive PUSCH transmissions, starting at the initial slot indicated by the period Q.

There can also be another configured period P' in terms of slots, which specifies the duration of the P DMRS bundled PUSCHs, i.e., the P PUSCHs with bundled DMRSs should all be contained within P' slots starting from the initial slot indicated by the period Q, such that P'≤Q. In this configuration, P' can be considered as the bundling unit duration.

FIG. 5 illustrates the use of P and P' in configuring DMRS bundling, according to an embodiment. Specifically, FIG. 5 illustrates how the values of Q, P, and P' determine the slots where DMRS bundling is enabled.

A DMRS bundling configuration can also specify a frequency part in which DMRS bundling is employed, such that DMRS bundling is allowed among the PUSCHs that are confined only to the indicated frequency part. This indication can be in terms of RBs.

The values of Q, P, and P' can be RRC configuration parameters within the DMRS bundling configuration. Alternatively, some/all of these parameters can be dynamically indicated in some DL signals from the gNB, e.g., in the scheduling PDCCH of a PUSCH. For example, Q and P' may be RRC configured, while P may be dynamically indicated in a DL signal. This provides the gNB with the capability to dynamically change the DMRS bundling duration.

A DMRS bundling configuration may be UE-specific or cell specific. If the DMRS bundling configuration is cell specific, the DMRS bundling configuration can be used to employ DMRS bundling with msg3 retransmissions if it is used. If the DMRS bundling configuration is UE-specific, a UE with DMRS bundling capability can use DMRS bundling across msg3 retransmissions, if those retransmissions fall within a DMRS bundling duration. Here, the UE should indicate its capability of DMRS bundling to the gNB.

A DMRS bundling configuration can also be equipped with an enabling/disabling mechanism. Specifically, a DMRS bundling configuration may be enabled/disabled based on signaling received by the UE from the gNB. This signaling can be a dedicated signal sent to the UE, or it can be piggybacked on other signals transmitted from the gNB to the UE. Alternatively, the configuration can also be set to be always active or enabled once it is configured at the UE.

The determination of periods based on Q starts from a specified slot. This slot can be the first slot in the frame with a system frame number (SFN) equal to 0, or this slot can be specified based on a signal received by the UE from the gNB, which enables the DMRS configuration. Alternatively, this slot can be the first slot of the first PUSCH transmission that occurs after receiving the triggering signal. Another alternative is that, if the value of Q is dynamically indicated, the determination of the periods based on Q can start from an earliest SRS transmission after the reception of a DL signal carrying Q, or a last SRS transmission before the reception of the DL signal carrying Q.

When the values of Q, P, or P are in terms of slots, they should be associated with a subcarrier spacing (SCS). This SCS can be the SCS of the bandwidth part (BWP), or it can be an SCS value that is configured in the DMRS bundling configuration. There can be a separate SCS configuration for each quantity, or one SCS configuration for all.

When choosing the value of P, it may be strictly made to be less than or equal to P'. In this case, if P=P', this means that each slot within the period of duration P' contains a DMRS bundled PUSCH. When P<P', this means that some slots do not contain a DMRS bundled PUSCH. Alternatively, the value of K can be arbitrarily chosen, letting the UE handle the case when P>P'. In this case, the UE can only use PUSCH transmissions within the period of duration P' for DMRS bundling, regardless of whether they are equal to P or not.

The value of P may correspond to a maximum number PUSCHs transmissions that are DMRS bundled within the period of duration P', although the actual number of PUSCH transmissions that are DMRS bundled depends on the actually scheduled/configured PUSCHs within the period.

When DMRS bundling configuration is configured, it may indicate that DMRS bundling applies to any kind of PUSCH configured during the DMRS duration (DG/SP/P-PUSCH). This is a simple solution with minimal configuration overhead.

Alternatively, the DMRS bundling configuration may be configured to indicate which kind of PUSCH it applies to. For example, there can be multiple DMRS bundling configurations where each configuration is associated with one kind of PUSCH. This gives more flexibility to the system. That is, it does not constrain the UE to use DMRS bundling on every possible PUSCH transmitted during the bundling duration.

As an alternative way of using DMRS bundling configuration, each configuration may be associated with an identity, such that PUSCHs can be configured/indicated to be associated with a certain DMRS bundling configuration. For example, if a PUSCH is configured to be associated with DMRS bundling configuration number i, if the PUSCH transmission falls within a DMRS bundling duration specified by configuration i, it will be DMRS bundled with all PUSCHs falling within this DMRS bundling duration and having an association with DMRS bundling configuration number i.

Figure 6:
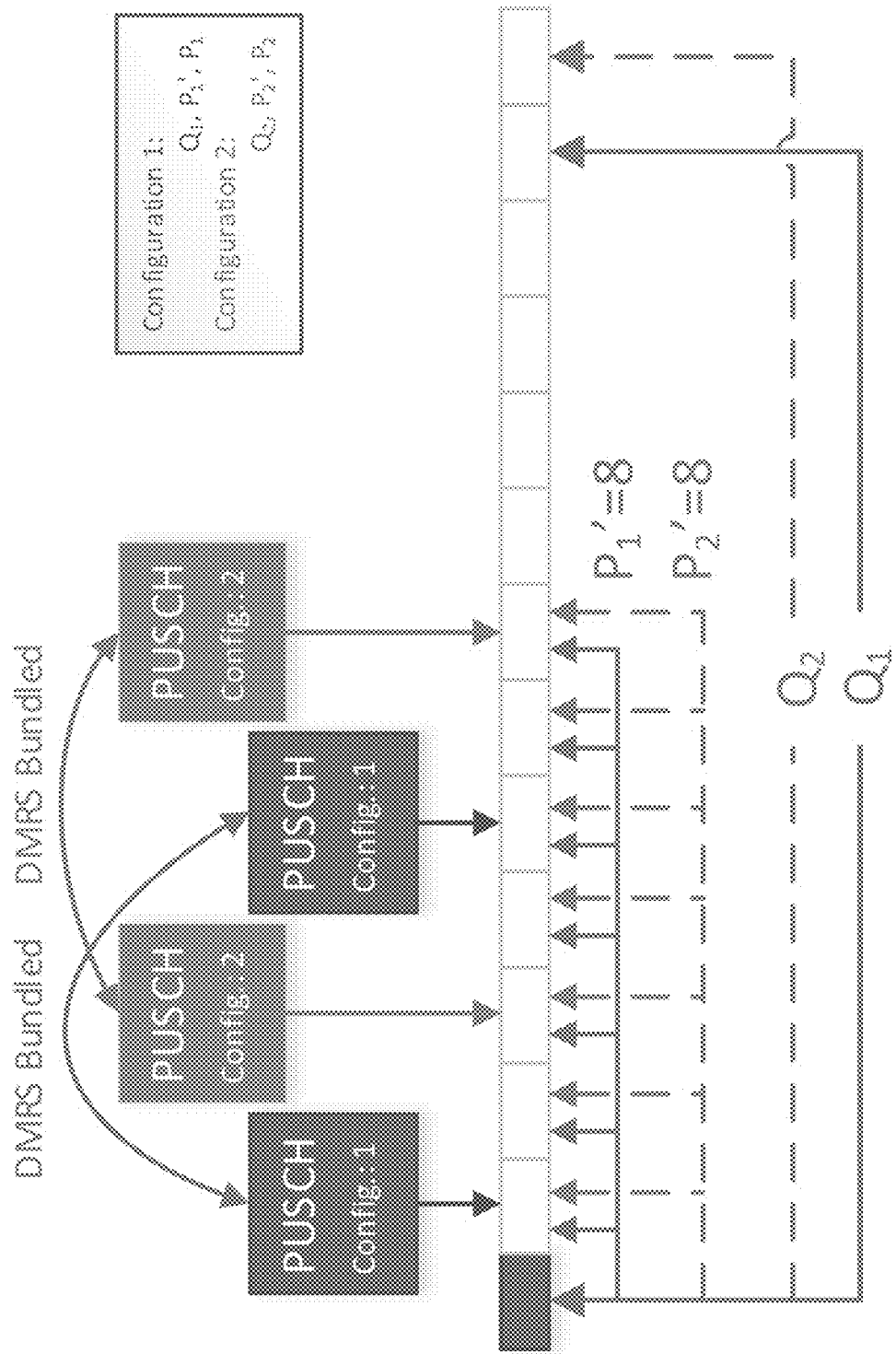
FIG. 6 illustrates utilization of a DMRS configuration identity for PUSCH association within a DMRS bundling configuration, according to an embodiment.

FIG. 6 illustrates utilization of a DMRS configuration identity for PUSCH association within a DMRS bundling configuration, according to an embodiment.

Referring to FIG. 6, two DMRS bundling configurations are utilized, one with $Q=Q_1$, $P'=P'_1=8$, and $P_1=4$, and the other with $Q=Q_2$, $P'=P'_2=8$, and $P_2=4$. In this case, 4 different PUSCHs are transmitted within the period where DMRS bundling can be performed according to both configurations. However, only the PUSCHs associated with the same configuration are DMRS bundled together.

The way an association of the PUSCH to a DMRS bundling configuration is specified may depend on the kind of PUSCH. For dynamically scheduled PUSCHs, this can be dynamically indicated through the scheduling DCI, e.g., by a change in the DCI format. It can also be RRC configured that all dynamically scheduled PUSCHs within a certain scope (e.g., within a certain BWP, frequency resource (FR), component carrier (CC), etc.) are associated with a particular DMRS bundling configuration. With such an RRC configuration, PUSCH DMRS bundling can also be enabled/disabled dynamically.

For a CG-based PUSCH, the association can be done via an RRC configuration, with possible activation/deactivation for the case of CG2.

SRS/CSI-RS Resource Configuration

In Rel-16, a UE is configured for an NCB PUSCH with one SRS resource set. Such a resource set can be aperiodic (A-SRS), periodic (P-SRS) or semi-persistent (SP-SRS). The Rel-16 SRS-Config consists of a set of SRS Resource set identifiers (IDs) which map to SRS Resource sets. The SRS-ResourceSet is configured with a parameter resourceType, which indicates whether the resource set is aperiodic, periodic, or semi-persistent. The parameter usage also indicates the usage of the SRS resource set (e.g., for NCB). Rel-16 allows at most one SRS resource set per UE to be used for NCB usage.

Similarly, the SRS resource set associated with NCB transmission is also configured with an NZP CSI-RS resource that is used for precoding matrix computation. This NZP CSI-RS can also be aperiodic (A-CSI), periodic (P-CSI) or semi-persistent (SP-CSI).

For CE scenarios, it is beneficial to reduce communication overhead between a gNB and a UE. Therefore, NCB, which does not rely on a gNB-based determination of precoding matrix, can be useful. For similar reasoning, configuring a P/SP-SRS resource set for NCB PUSCH transmission can also be useful.

A UE can rely on a CG1-PUSCH or a CG2-PUSCH to send NCB PUSCH transmissions without a dynamically transmitted scheduling PDCCH. Therefore, it would be beneficial to ensure that a gNB can employ DMRS bundling on such NCB PUSCH transmissions using CG1 or CG2 and with a corresponding P/SP-SRS used for precoding determination.

Similarly, it may be beneficial for CE to configure NCB SRS resources with associated NZP CSI resources that are periodic/semi-persistent. In this case, the gNB periodically sends CSI-RS signals to the UE, which the UE may use to determine the precoding matrix for the NCB PUSCH transmissions. The UE then uses this precoding matrix to encode the corresponding periodic/semi-persistent NCB SRS resources.

A UE may be configured with a precoding determination rule to use the precoding matrix corresponding to the latest SRS resources with an SRI matching those indicated for the scheduled PUSCHs to be bundled.

Assuming that a gNB wants a UE to use the same precoding matrix for all bundled PUSCHs, according to the previous rule, the gNB should ensure that 1) all bundled PUSCHs have the same associated SRI, and 2) no SRS transmission happens between the first and last PUSCHs with bundled DMRS resources.

One mechanism to ensure this behavior is to configure the UE with no SRS transmissions between the bundled PUSCHs. This configuration can be via RRC configurations or performed dynamically.

More specifically, for a UE that is configured with an NCB CG1/CG2-PUSCH and an NCB P/SP-SRS, P/SP-SRS configuration can contain certain "quiet" periods where the UE stops SRS transmission. These periods may correspond to periods in which CG1/CG2 transmissions can be DMRS bundled. The extra configuration in the P/SP-SRS, which indicates these quiet periods, can be neglected by a legacy UE for backward compatibility. The configuration for the quiet periods can be a separate configuration, or embedded into the SRS configuration.

Figure 7:
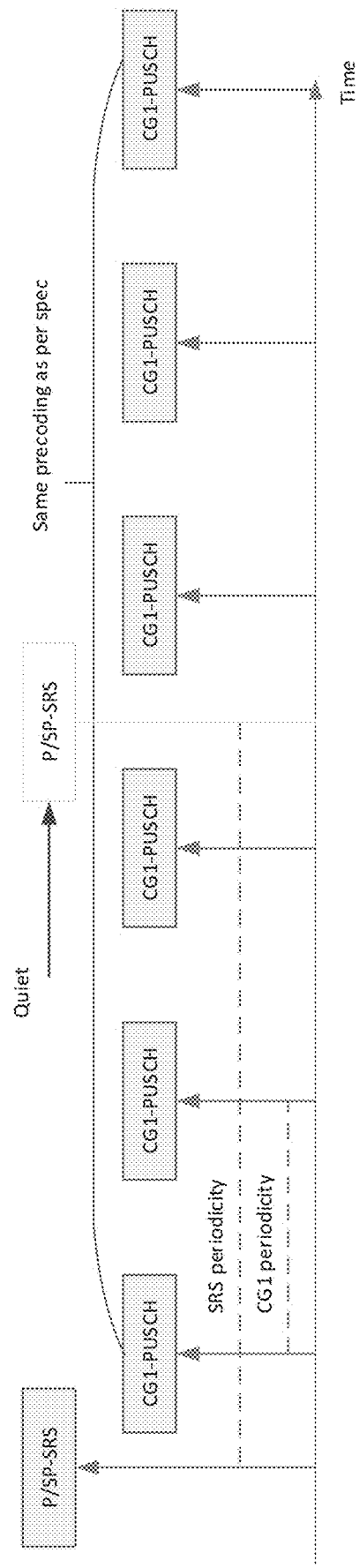
FIG. 7 illustrates an example of a quiet period during which a UE stops SRS transmission within DMRS bundling, according to an embodiment.

FIG. 7 illustrates an example of a quiet period during which a UE stops SRS transmission within DMRS bundling, according to an embodiment.

An NCB CG1/CG2-PUSCH can be configured with a P/SP-SRS resource set that ensures that SRS transmissions happen only between complete sets of K transmissions. That is, the relative periodicity of P/SP-SRS transmissions and CG1/CG2-PUSCH transmissions determine the bundling length.

In Rel-16, only one NCB-based SRS resource set can be configured. However, the aforementioned scheme limits the flexibility to schedule NCB SRS resources. Therefore, in accordance with an embodiment of the disclosure, two or more NCB SRS resource sets can be configured at the UE, where one SRS resource set can be configured with the required periodicity to enable bundling as previously described. In this case, the RRC configuration of the NCB CG1/CG2-PUSCH can also specify which SRS resource to be used.

To allow backward compatibility, all other non-bundling based NCB PUSCH configurations may be associated with one legacy NCB SRS resource set, and all other NCB SRS resource sets are neglected by legacy UEs.

Figure 8:
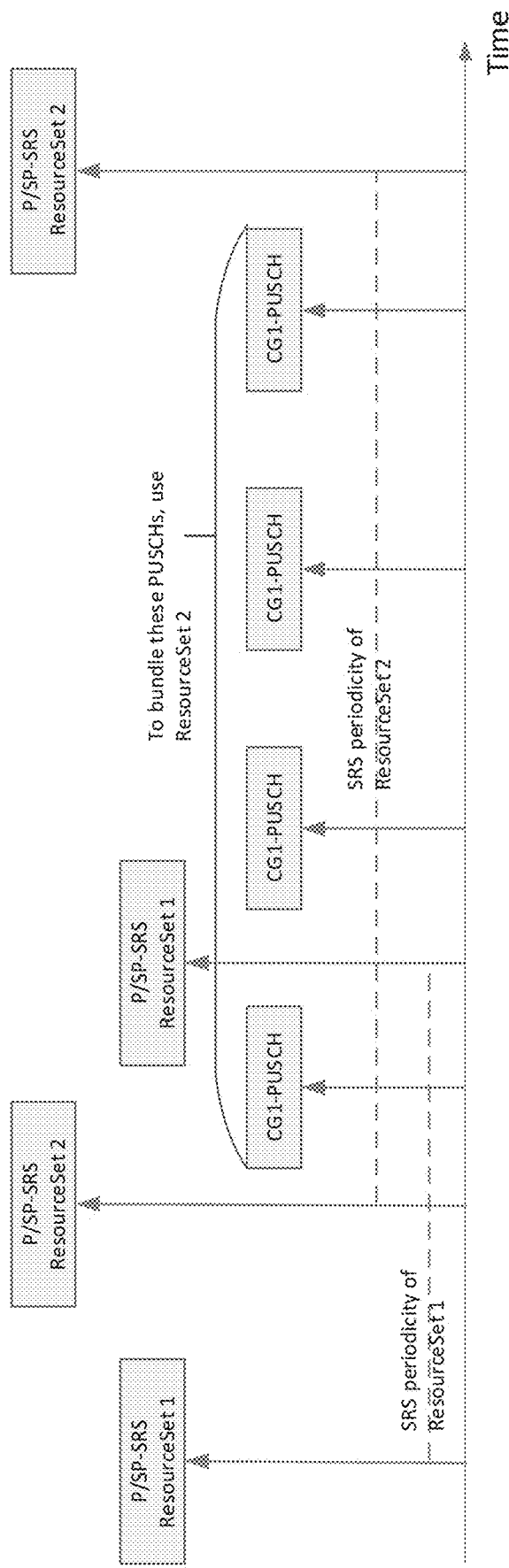
FIG. 8 illustrates the use of multiple P/SP-SRS resource sets for precoding determination within DMRS bundling, according to an embodiment.

FIG. 8 illustrates the use of multiple P/SP-SRS resource sets for precoding determination within DMRS bundling, according to an embodiment.

For a CG1/CG2-PUSCH with an NCB P/SP-SRS, Rel-16 allows a UE to be configured with one periodic SRS resource set for NCB usage. When the SRS resource set is configured to be periodic, the periodicity of each SRS resource is configured via the parameter periodicityAndOffset-p. In accordance with an embodiment of the disclosure, however, a UE may be configured with more than one SRS resource set with NCB usage. The other NCB SRS resource sets can also be configured as periodic, or alternatively, can be configured to be aperiodic or semi-persistent.

When multiple SRS resource sets are configured with usage set to NCB, a UE should be informed as to which SRS resource set to use for determining precoding matrices for NCB PUSCH transmissions. A UE may be configured with a CG PUSCH via the ConfiguredGrantConfig IE. For CG1, ConfiguredGrantConfig contains the parameter rrc-ConfiguredUplinkGrant, which details the UL grant configuration to be used for PUSCH transmissions. In case CG1 is used for NCB transmissions, the parameter SRS-ResourceIndicator included in the configured UL grant specifies which SRS resources are to be used for determining the precoding matrices of the CG1-PUSCH. In Rel-16, only one SRS resource set is configured with usage being NCB, and the SRS resource indicator parameter naturally refers to resources within this SRS resource set. According to an embodiment of the disclosure, additional SRS resource sets are introduced with usage set to NCB. Therefore, an additional parameter may be configured in rrc-ConfiguredUplinkGrant, which specifies which NCB SRS resource set to use for precoding matrix determination. The additional parameter can be SRS-ResourceSetID, which indicates the SRS resource set ID to be used.

The use of multiple SRS resource sets with usage set to NCB can also be used with a DG-PUSCH and a CG2-PUSCH. Namely, a UE can be configured with an additional RRC parameter that indicates which SRS resource set ID is to be used for the DG-PUSCH or CG2-PUSCH. Alternatively, this information may be conveyed in a scheduling/activating PDCCH, e.g., utilizing a modification in the associated DCI. The DG-PUSCH and/or CG2-PUSCH may be implicitly associated with one SRS resource set ID (e.g., the one with the smallest ID), which effectively results in Rel-16 behavior.

Alternatively, the UE can be configured to handle multiple SRS transmissions during the K bundled transmissions. Specifically, the NCB CG1/CG2-PUSCH configuration may specify that each consecutive set of K PUSCH transmissions is DMRS bundled. In this case, the UE ensures that the precoding matrix used for each consecutive K transmissions is the same. This can be based on the latest SRS resource before the K transmissions, or it can be configured/indicated as to which SRS resource to use for precoding matrix determination.

A UE may receive an indication of the SRI, which indicates the SRS resources that are associated with the bundled PUSCHs, and an indication of which SRS resource to use among the previously transmitted SRS resources. In accordance with an embodiment of the disclosure, a mechanism is provided to allow such indication.

SRS-RS and CSI-RS Enhancement: Quiet Periods

To enable DMRS bundling, a gNB may require a precoding matrix used for all PUSCH transmissions with bundled DMRS resources to be the same. In this case, a UE, after determining a precoding matrix to use for the PUSCH with bundled DMRS resources, may not update this precoding matrix. Therefore, it can be beneficial to indicate that the unused SRS-RS and CSI-RS resources are not transmitted by the UE nor the gNB.

Figure 9:
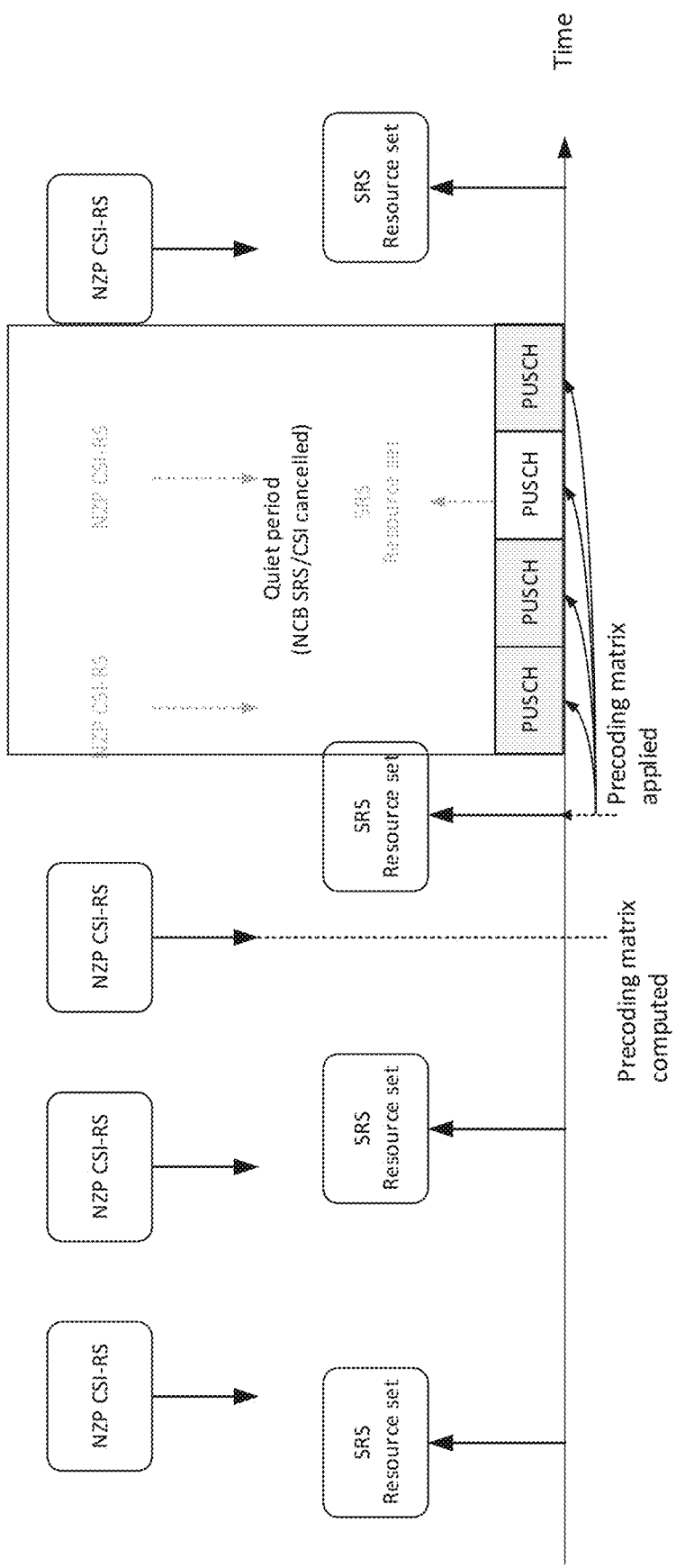
FIG. 9 illustrates a quiet period configuration, according to an embodiment.

FIG. 9 illustrates a quiet period configuration, according to an embodiment.

Referring to FIG. 9, a UE is configured with a periodic NCB SRS resource set configuration and periodic NZP CSI-RS resources associated with NCB SRS resources. In addition, the UE is configured to transmit PUSCHs with bundled DMRS resources. Here, the UE is required to maintain the same precoding matrix for all of the PUSCH transmissions. Therefore, the exchange of NCB SRS resources and the associated CSI-RS resources may not be useful during the PUSCH transmissions. This define a "quiet period" during the PUSCH transmissions.

On the UE side, the UE can refrain from transmitting NCB SRS resources during the quiet period.

On the gNB side, the gNB can refrain from transmitting CSI-RS resources, which are associated with the cancelled NCB SRS transmissions, during the quiet period. Refraining from transmitting CSI-RS can be dependent on whether it is solely used for NCB precoding determination or not.

SRS/CSI-RS transmissions towards the end of the DMRS bundling duration can be useful for the UE to make a channel estimation and a precoding matrix computation for later NCB PUSCH transmissions. In this case, the quiet period can be smaller than the DMRS bundling operation. Herein, this will be referred to as a "reduced quiet period".

Figure 10:
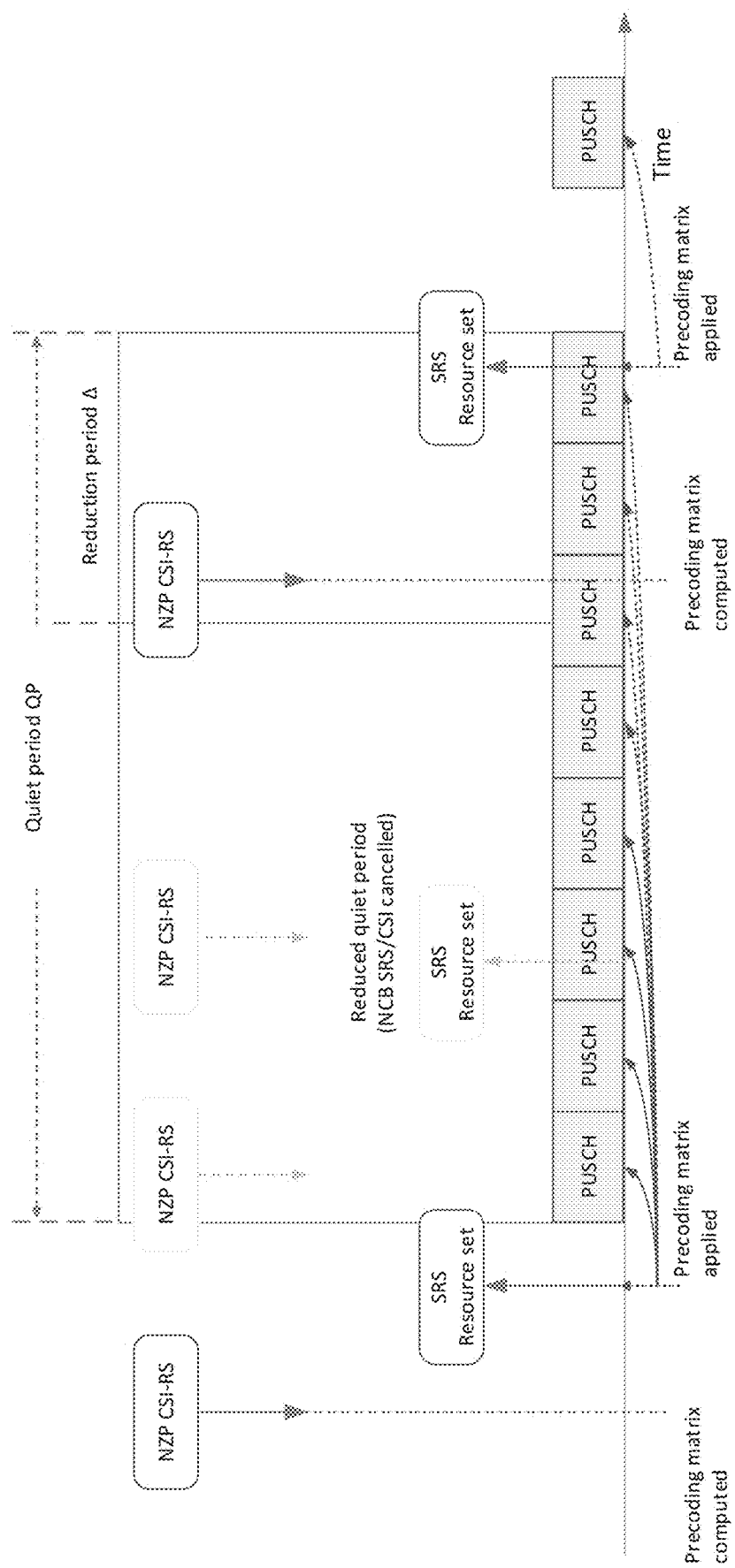
FIG. 10 illustrates a reduced quiet period configuration, according to an embodiment.

FIG. 10 illustrates a reduced quiet period configuration, according to an embodiment.

Referring to FIG. 10, the difference between the reduced quiet period and the DMRS bundling duration is labeled by reduction period $\Delta$. In this example, the reduced quiet period is smaller than the bundling duration with a duration $\Delta$, where NZP CSI-RS and SRS-RS transmissions can be allowed within this reduction period to be used for later PUSCH transmissions.

A reduced quiet period configured with a value of $\Delta$ equal to zero is equivalent to a quiet period. Therefore, quiet periods are described below by considering reduced quiet periods with the value of $\Delta$ set to zero.

A configuration of a reduced quiet period can be explicit or implicit. For example, a gNB can explicitly determine the duration of the quiet period QP and the value of the reduction period $\Delta$. The UE then uses these configured/indicated values to determine the duration of the reduced quiet period.

The gNB may explicitly configure the value of the reduction period $\Delta$, and the UE infers the value of the quiet period QP by considering the duration of bundling. From these two quantities, the reduced quiet period can be inferred by the UE.

Implicit determination of the quiet period QP is dependent on the DMRS bundling configuration. For example, for a CG1/CG2-PUSCH DMRS bundling configuration, knowing the number K of PUSCH transmissions with bundled DMRS resources, or alternatively the periodicity Q and the duration P of DMRS bundling, the quiet period can be determined from the DMRS bundling configuration.

Similarly, for a DG-PUSCH, a gNB can indicate the bundling information (e.g., bundling length, SRS resources to use for precoding matrix computation, etc.) via a PDCCH, which can be used to determine the quiet period duration. If DMRS bundling is enabled over PUSCH repetitions, then the quiet period may be the duration of the PUSCH aggregation. If DMRS bundling is enabled over PUSCHs with different TBs, then the quiet period may be the duration of the PUSCHs included in the DMRS bundling duration indicated in the scheduling PDCCH of the first PUSCH.

If the UE is configured with independent DMRS bundling configuration, it can infer the quiet period from knowing the bundling periodicity Q and duration P (for both interpretations of the value P; in terms of slots or in terms of PUSCH transmissions). The configuration of a reduced quiet period on the UE side can be via RRC configuration, dynamic scheduling, or both.

Handling CI/SFI During PUSCH Transmission with DMRS Bundling

In Rel-16, a UE is expected to receive a CI and/or SFI indication. Such indication can prevent the UE from commencing/continuing the transmission of PUSCH signals in some affected slots. In the case of a CI, the following statement exists in Rel-16 spec:

A UE that detects a DCI format 2_4 for a serving cell cancels a PUSCH transmission, or a repetition of a PUSCH transmission [6, TS 38.214] if the PUSCH transmission is with repetitions, or an SRS transmission on the serving cell if, respectively, a group of symbols, from the T_"CI" symbols, has a corresponding bit value of '1' in the DCI format 2_4 and includes a symbol of the (repetition of the) PUSCH transmission or of the SRS transmission, and a group of PRBs, from the B_"CI" PRBs, has a corresponding bit value of '1' in the DCI format 2_4 and includes a PRB of the (repetition of the) PUSCH transmission or of the SRS transmission, where the cancellation of the (repetition of the) PUSCH transmission includes all symbols from the earliest symbol of the (repetition of the) PUSCH transmission that are in one or more groups of symbols having corresponding bit values of '1' in the DCI format 2_4;

the cancellation of the SRS transmission includes only symbols that are in one or more groups of symbols having corresponding bit values of '1' in the DCI format 2_4.

In the case of SFI, the following statements in Rel-16 describe the UE behavior:

For a set of symbols of a slot that are indicated to a UE as downlink by tdd-UL-DL-ConfigurationCommon, or tdd-UL-DL-ConfigurationDedicated, the UE does not transmit PUSCH, PUCCH, PRACH, or SRS when the PUSCH, PUCCH, PRACH, or SRS overlaps, even partially, with the set of symbols of the slot.

The aforementioned statements indicate that a UE with a scheduled PUSCH in certain resources (symbols/subcarriers (SCs)) does not transmit the PUSCH if it is affected (i.e., indicated not to transmit) by the received CI/SFI even partially. While the received CI/SFI may have indicated only part of the PUSCH to be time/frequency resources in which UL transmission is not allowed, the UE could have technically continued with the transmission of the remaining resources of the PUSCH. However, this may not be the case as these resources are likely to be not useful in terms of conveying the scheduled TB for UL transmission, and therefore, it would be beneficial to seize transmission, both from a network perspective (to reuse resources) and a UE perspective (to save transmission energy).

When DMRS bundling is allowed between multiple PUSCH transmissions, the transmission of the set of PUSCHs with bundled DMRS resources rely on the collective DMRS resources of these PUSCH transmissions for the channel estimation of each PUSCH. In some cases, the DMRS resources of one PUSCH are reduced or eliminated (a situation occasionally referred to as DMRS-less PUSCH transmission) and bundled DMRS resources of other PUSCHs are used for channel estimation. These configurations may be particularly useful in low signal-to-noise ratio (SNR) situations that occur in CE scenarios.

Various embodiments of the disclosure will be described below with reference to a situation when a cancellation indication is received (or identified) by a UE and affects one or more PUSCHs, which belong in a (possibly larger) group of PUSCHs with bundled DMRS resources. Herein, this group of PUSCHs with bundled DMRS resources is referred to as "bundled PUSCHs". Although a cancellation indication will be described below with reference to a CI/SFI by way of example, the disclosure is not limited thereto. Herein, a cancelation indication may include any indication that a UL transmission in some resources is to be omitted. The cancellation indication may be in the form of, e.g., a CI or a conflict with an SFI, as described below, but may also be a conflict with another UL signal having a higher priority, and so on.

A UE may receive a CI/SFI indication that affects the transmission of a PUSCH. If a UE seizes transmission for the PUSCH and its associated DMRS resources, the remaining DMRS resources among the bundled PUSCHs may not be sufficient for performing accurate CE for the remaining PUSCHs in the group. For example, this may happen if the remaining PUSCHs have insufficiently low DMRS resources, as illustrated in FIG. 11, or if the remaining PUSCHs are DMRS-less, as illustrated in FIG. 12.

Figure 11:
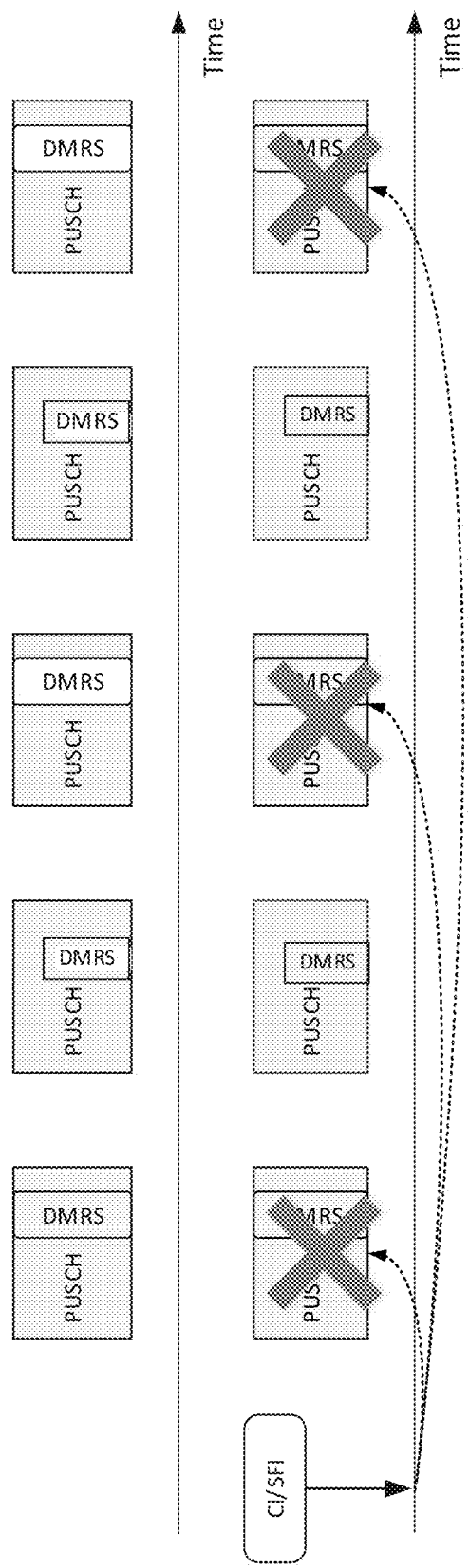
FIG. 11 illustrates CI/SFI effect on bundled PUSCHs, when some PUSCH have low DMRS intermediate values, according to an embodiment.

FIG. 11 illustrates CI/SFI effect on bundled PUSCHs, when some PUSCH have low DMRS intermediate values, according to an embodiment.

Figure 12:
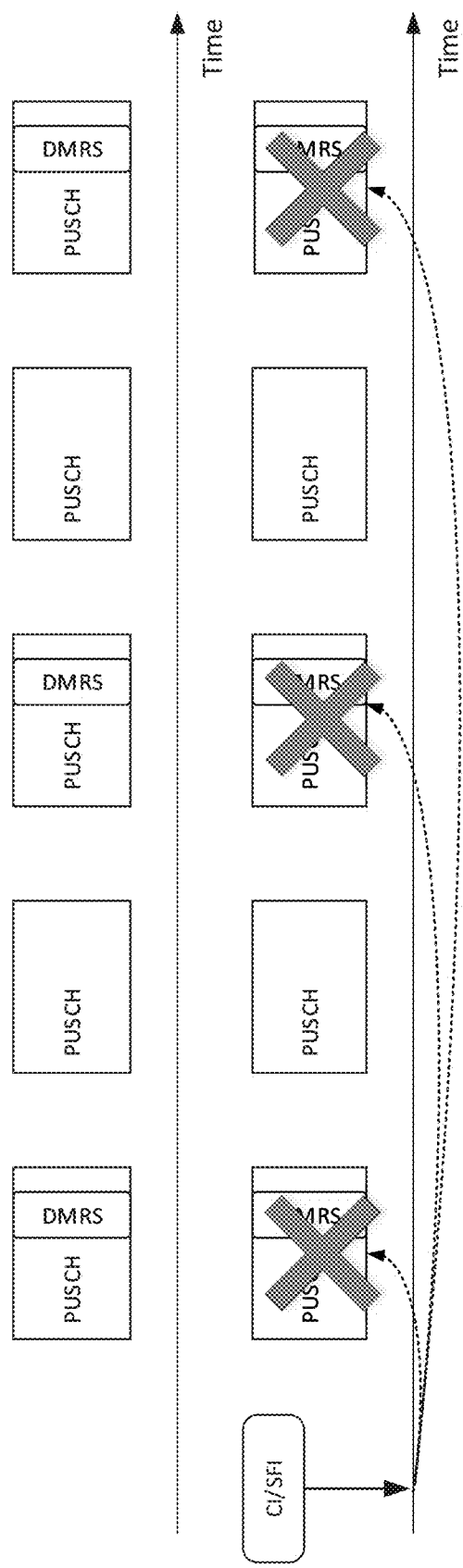
FIG. 12 illustrates CI/SFI effect on bundled PUSCHs, when some PUSCHs are DMRS-less, according to an embodiment.

FIG. 12 illustrates CI/SFI effect on bundled PUSCHs, when some PUSCHs are DMRS-less, according to an embodiment.

The following embodiments are directed to handling reception of a CI/SFI affecting one or more PUSCHs among a set of bundled PUSCHs.

Embodiment 1

Embodiment 1 provides different options of handling PUSCHs among bundled PUSCHs, which are directly affected by a received CI/SFI. In Embodiment 1, it is assumed that the CI/SFI directly impacts some of the DMRS resources of one or more PUSCHs (e.g., the CI indicates the UL transmission in at least one RE among DMRS resources is cancelled, or the SFI indicates at least one symbol of the DMRS resources not to be UL). The UE cancels the UL transmission in the affected DMRS resources of the PUSCHs. Then, the following cases are described for how the UE handles the UL transmission in the remaining REs of the affected PUSCHs, i.e., the remaining REs containing DMRS resources and non-DMRS (i.e., data) resources.

1. The UE seizes UL transmission of all remaining resources. This follows Rel-16 behavior.

2. The UE seizes UL transmission of all remaining non-DMRS resources, while continuing transmission of remaining DMRS resources.

3. The UE continues UL transmission of all remaining resources.

Both options 2 and 3 have the benefit of retaining the DMRS resources that are used by other PUSCHs in the bundled PUSCHs.

The operation of the UE regarding the remaining REs of affected PUSCHs may be dependent on whether the REs are located before or after the REs indicated for cancellation by the CI/SFI. For example, a UE can use options 2 or 3 for the REs located before the CI/SFI cancelled REs, while using option 1 for REs that are located after the CI/SFI cancelled REs. This may avoid the possibly hard-to-implement operation of stop-then-resume transmissions associated with options 2 and 3 with later REs.

The behavior of the UE is expected to follow the timeline introduced by the processing time constraints of the UE. That is, a UE is not expected to seize/continue UL transmission in any RE that is before/after the cancelled REs and within the allowable time processing constraint.

Another way to handle a CI affecting bundled PUSCHs is to consider some PUSCHs to be of higher priority, and therefore, not affected by the CI. Determining which PUSCHs are of higher priority can be based on, e.g., having higher DMRS intermediate values, and therefore, are important for the channel estimation quality of other PUSCHs.

Embodiment 2

Embodiment 2 is directed to how, upon receiving a CI/SFI indication affecting some PUSCHs of bundled PUSCHs, a UE handles the rest of PUSCHs in the bundled PUSCHs.

Embodiment 2 provides the following options:

1. The UE continues transmitting the PUSCHs that are not directly affected by the CI/SFI. This option has no specification impact. However, this option has the potential of wasting resources. By sending PUSCHs that may be unlikely to be correctly decoded, time/frequency and power resources are likely being wasted.

2. The UE seizes transmission of all bundled PUSCHs, even the PUSCHs that are not directly affected by the CI/SFI. This option provides the opposite alternative of option 1, i.e., it avoids the possibility of resource waste at the expense of losing a chance of PUSCH successful transmissions.

3. A decision of whether to transmit the PUSCHs, other than the ones affected by the CI/SFI. This decision may be based on the estimated likelihood of correct reception of the transmitted PUSCHs.

a. This decision may be agreed on between the UE and the gNB. In this case, the gNB may reuse the resources allocated for those PUSCHs.

b. The decision may be left up to the UE. In this case, the gNB should monitor the resources allocated for those PUSCHs for potential UE transmissions.

With respect to option 3, the decision to transmit the other PUSCHs may be based on various factors. One factor may be the availability of sufficient DMRS resources for successful decoding of the transmitted PUSCHs.

Figure 13:
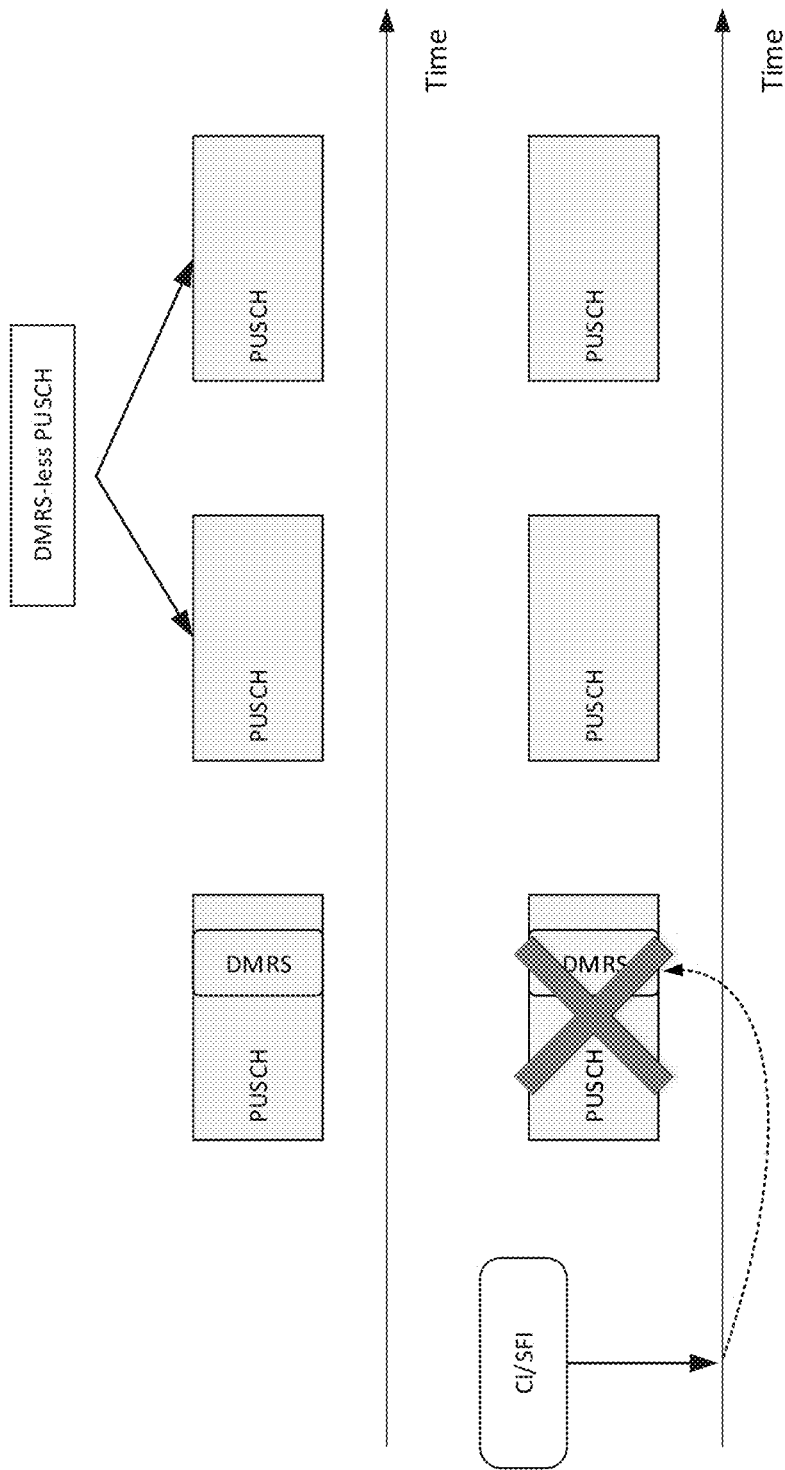
FIG. 13 illustrates a CI/SFI that cancels only a PUSCH with DMRS resources in a group of bundled PUSCHs, according to an embodiment.

FIG. 13 illustrates a CI/SFI that cancels only a PUSCH with DMRS resources in a group of bundled PUSCHs, according to an embodiment.

Referring to FIG. 13, only the PUSCH with DMRS is cancelled, and the other PUSCHs in the bundled PUSCHs group are all DMRS-less. In this case, the other PUSCH transmissions are likely to be unsuccessfully decoded.

Embodiment 2A

Embodiment 2A provides more detail regarding option 2 in Embodiment 2. Namely, the Embodiment 2A describes a procedure adopted by a gNB and/or a UE in determining whether/which other PUSCHs are to be cancelled as a consequence of the cancelled resources due to CI/SFI.

Figure 14:
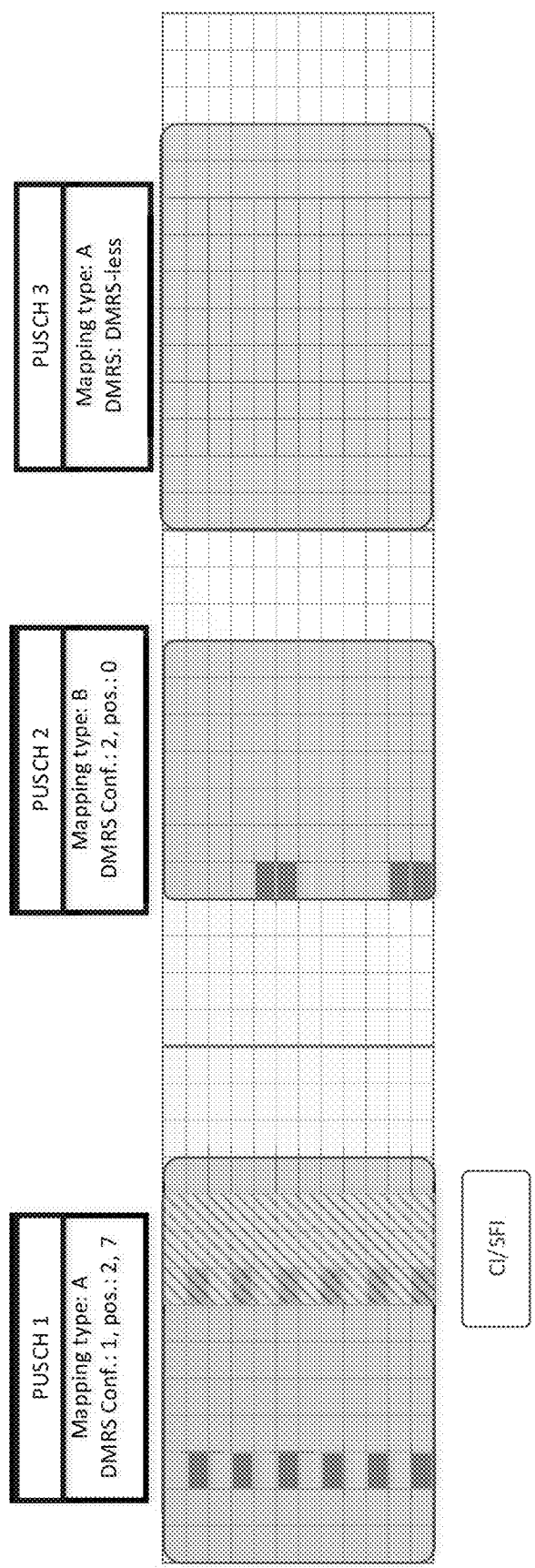
FIG. 14 illustrates a set of three bundled PUSCHs and a UL cancellation effect due to a received CI/SFI, according to an embodiment.

FIG. 14 illustrates a set of three bundled PUSCHs and a UL cancellation effect due to a received CI/SFI, according to an embodiment.

More specifically, the example illustrated in FIG. 14, includes three consecutive PUSCHs with bundled DMRS resources. The CI/SFI indication leads to the cancellation of the UL transmissions in the indicated resources of the first PUSCH (PUSCH 1).

From a high level, a determination of how to handle the remaining PUSCH transmissions, consists of three main steps:

1. Determine the remaining resources among the set of bundled PUSCH, both for data and DMRS transmissions.

2. Compute a set of intermediate values, referred to as DMRS intermediate values, based on the determined remaining resources from the previous step. These values may provide an indication as to the likelihood that the channel estimation procedure will provide high quality estimates.

3. Use the DMRS intermediate values to determine which PUSCH transmissions are completed/cancelled.

Figure 15:
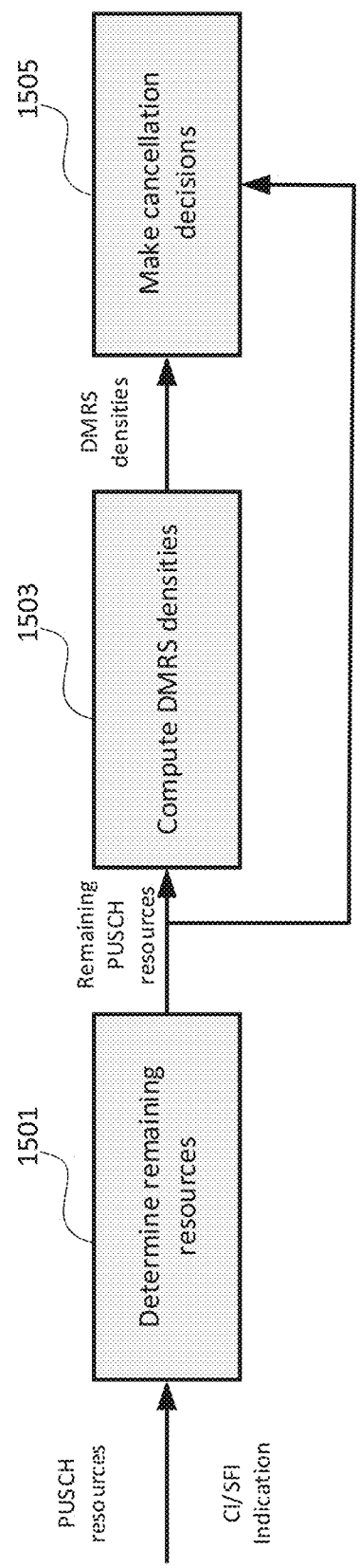
FIG. 15 illustrates a method of handling remaining PUSCH transmissions, according to an embodiment.

FIG. 15 illustrates a method of handling remaining PUSCH transmissions, according to an embodiment.

Referring to FIG. 15, in step 1501, a gNB and/or a UE determines a set of PUSCH resources that are remaining after receiving a CI/SFI indication. Step 1501 may follow the scheme described above in Embodiment 1. For example, using the example illustrated in FIG. 14, assume that step 1501 follows the procedure described in Embodiment 1, i.e., within PUSCH 1, the DMRS resources that are not affected by the CI/SFI are retained. The remaining PUSCH resources are illustrated in FIG. 16.

Figure 16:
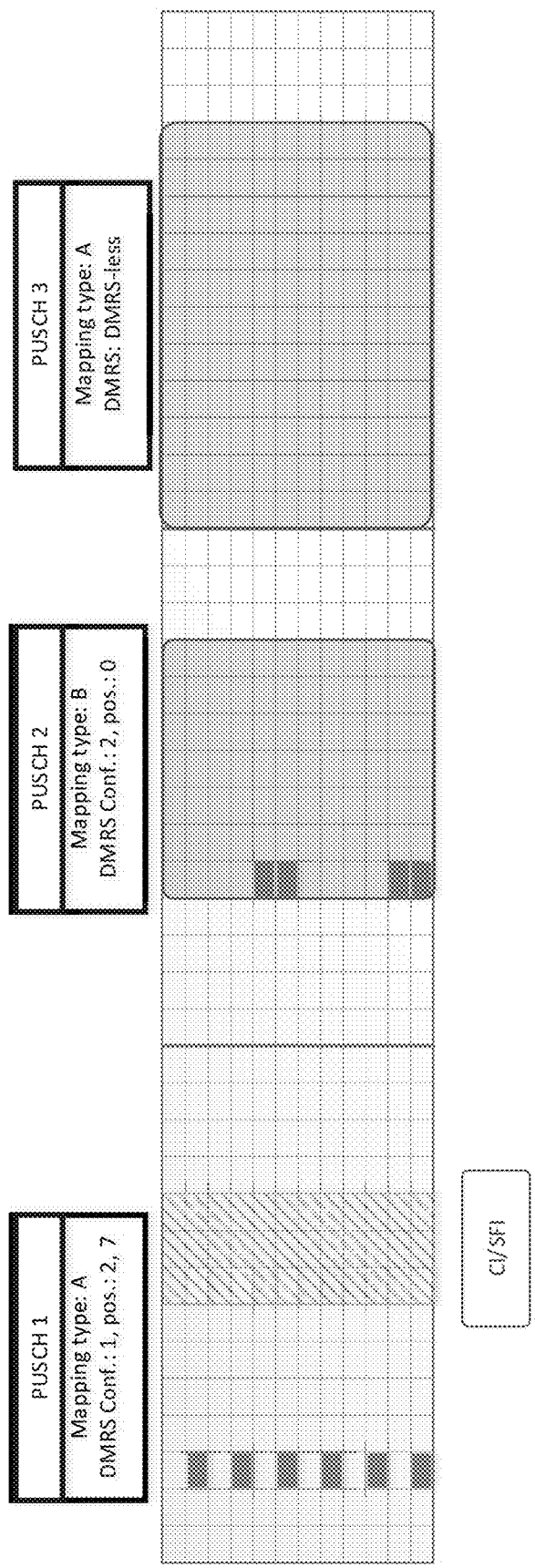
FIG. 16 illustrates a set of bundled PUSCHs after determining remaining resources, according to an embodiment.

FIG. 16 illustrates a set of bundled PUSCHs after determining remaining resources, according to an embodiment.

As illustrated in FIG. 16, some resources from the cancelled PUSCH (PUSCH 1) are retained.

Referring again to FIG. 15, in step 1503, the remaining set of resources are used as input, and a set of intermediate values are computed for making additional cancellation decisions. Each intermediate value may be computed as the number of DMRS resources in a particular collection of REs, and as such, may be referred as a DMRS intermediate value. The different intermediate values correspond to different collections of REs. The DMRS intermediate values may be labeled as $X_i$, i={1, 2, ... }.

In computing $X_i$, the collection of REs can be the set of REs within particular time/frequency ranges. The ranges corresponding to each $X_i$ can be different. For example, the frequency range used for determining $X_i$ can be one SC, one RB, etc. The time range can be one symbol, one slot, one subframe, one frame, multiples of slots, etc. These time/frequency ranges should only span the time slots and RBs corresponding to the bundled PUSCHs.

Figure 17:
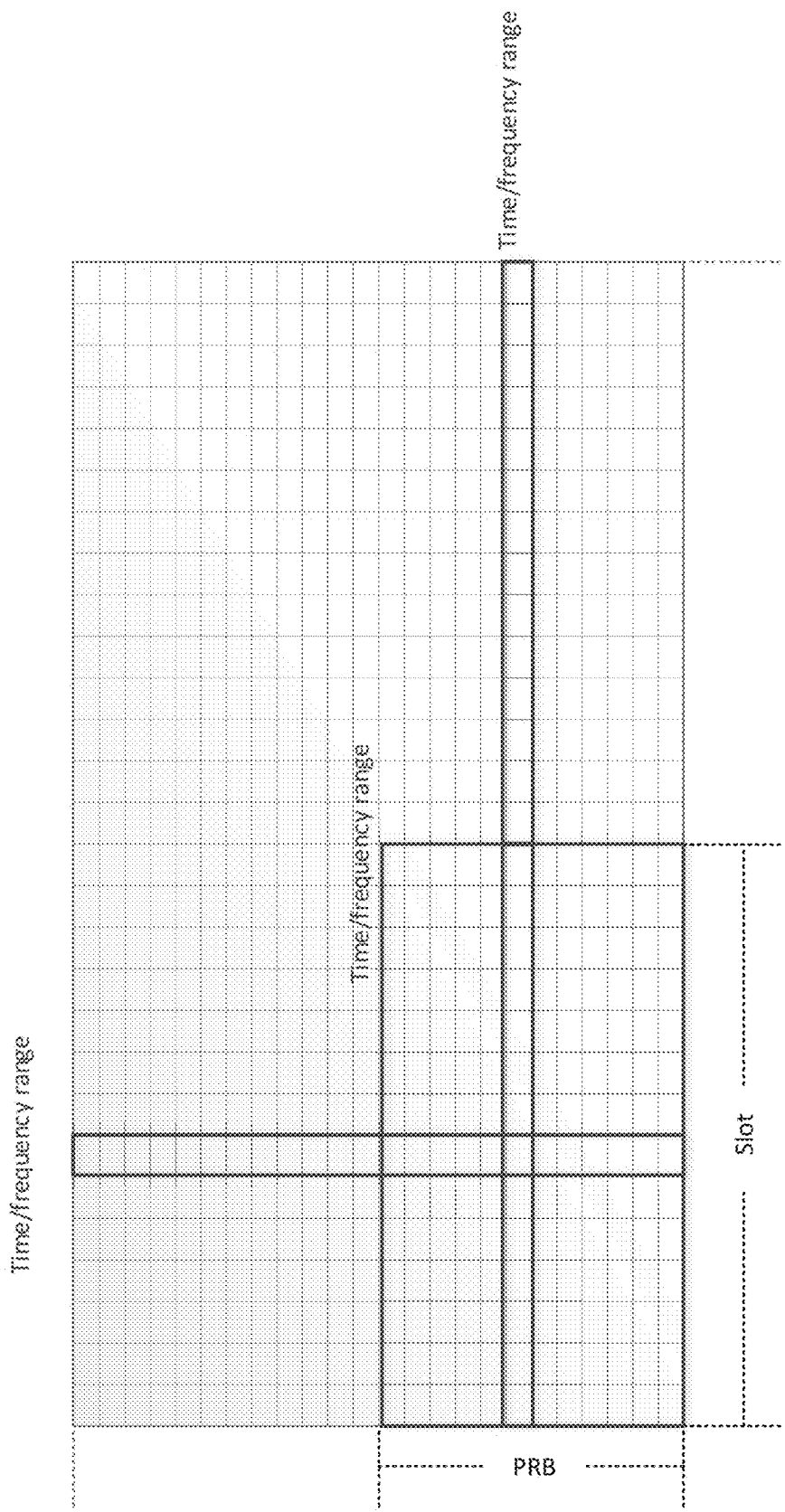
FIG. 17 illustrates examples of time/frequency ranges, according to an embodiment.

FIG. 17 illustrates examples of time/frequency ranges, according to an embodiment.

Different mechanisms may be used for determining the time/frequency ranges to be used for computing DMRS intermediate values.

Mechanism 1: when a frequency range consists of multiple SCs (e.g., one RB) or the time range consists of multiple symbols (e.g., a slot), the time/frequency ranges for different values of $X_i$ can be non-overlapping time/frequency ranges, or overlapping time/frequency ranges.

Figure 18:
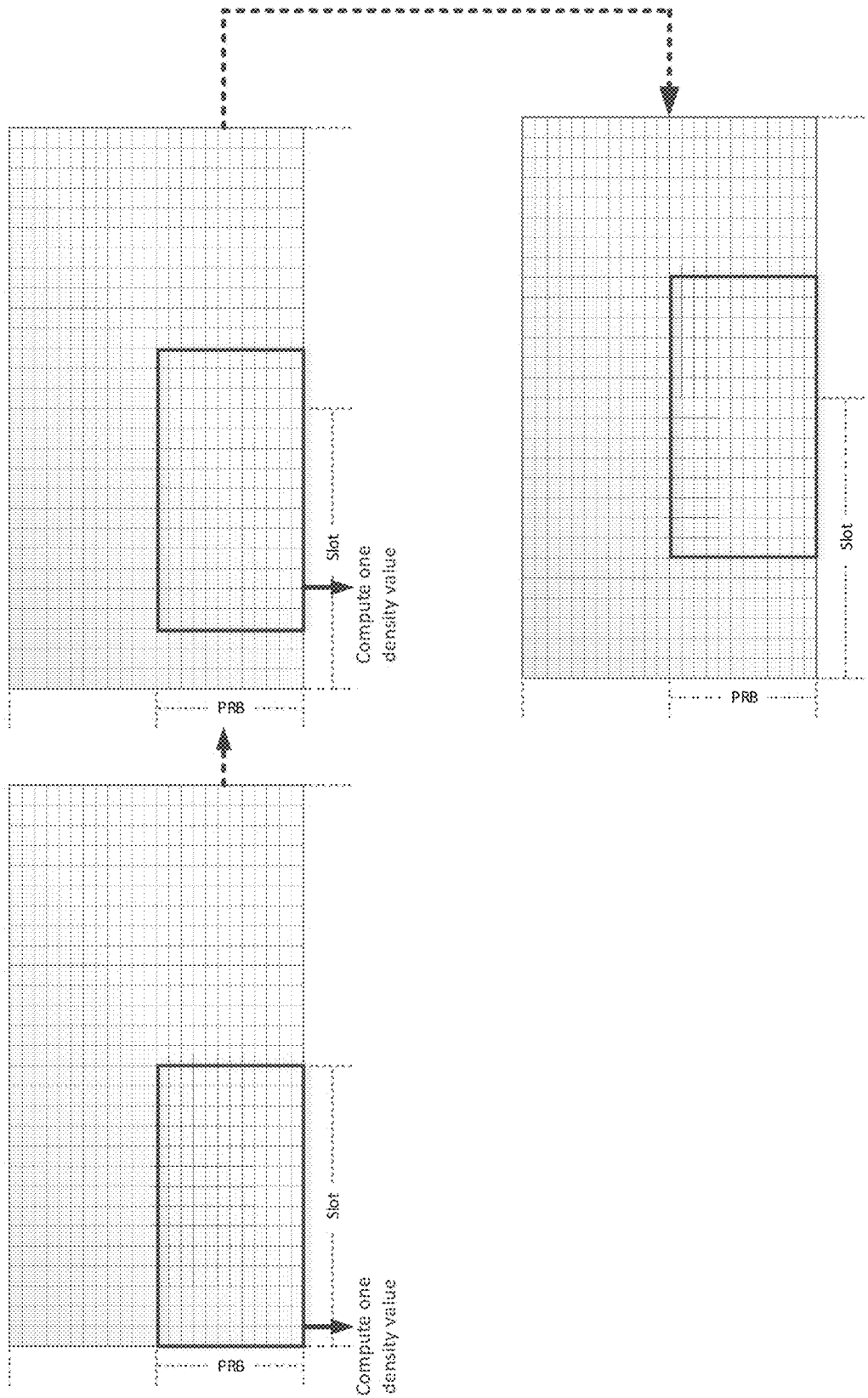
FIG. 18 illustrates a method of determining time/frequency ranges in an overlapping manner, according to an embodiment.

FIG. 18 illustrates a method of determining time/frequency ranges in an overlapping manner, according to an embodiment. More specifically, FIG. 18 shows how the operation of overlapping DMRS intermediate value computation works.

Referring to FIG. 18, the amount of overlapping between time/frequency ranges can be a configurable parameter. The illustrated example shows that the overlapping between time/frequency resources is 3 symbols, although different values can be used. Similar behavior in frequency can also be adopted. The same or different parameter can be indicated to configure the amount of overlap between time/frequency ranges in the frequency domain.

Figure 19:
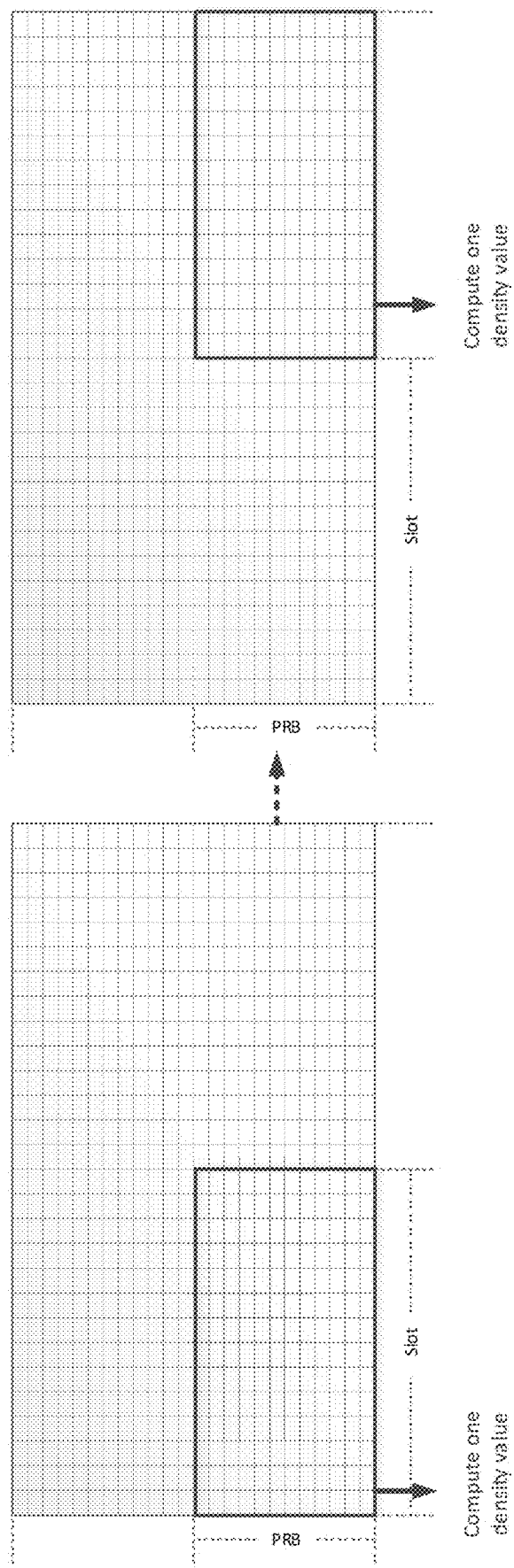
FIG. 19 illustrates a method of determining time/frequency ranges in a non-overlapping manner, according to an embodiment.

FIG. 19 illustrates a method of determining time/frequency ranges in a non-overlapping manner, according to an embodiment. More specifically, FIG. 19 shows how the DMRS intermediate values can be computed without overlapping time/frequency ranges.

The value of $X_i$ can be interpreted as how many DMRS resources are available for the channel estimation procedure on the resources within the corresponding time/frequency range, wherein a low/high value of $X_i$ can indicate the likelihood of a good/poor channel estimation quality on these resources. There are different ways for computing the value of $X_i$. For example, the value of $X_i$ can be the total number of DMRS REs within the time/frequency range, or the value of $X_i$ can be the total number of particular DMRS RE patterns within the time/frequency range. For example, assuming that the frequency range for each DMRS intermediate value is one RB, $X_i$ can correspond to the number of OFDM symbols with a particular DMRS pattern (e.g., 1-comb pattern or 2-comb pattern).

The value of $X_i$ can also be the total number of DMRS REs divided by the total number of PUSCH REs within the time/frequency range. This value may provide an indication on how densely packed the PUSCH REs along with the DMRS REs in the same time/frequency range, which may indicate how good the channel estimation quality is expected to be. In this alternative, the value of $X_i$ can be neglected if the time/frequency range does not contain any PUSCH REs. Other ways of computing $X_i$ can also be adopted.

Figure 20:
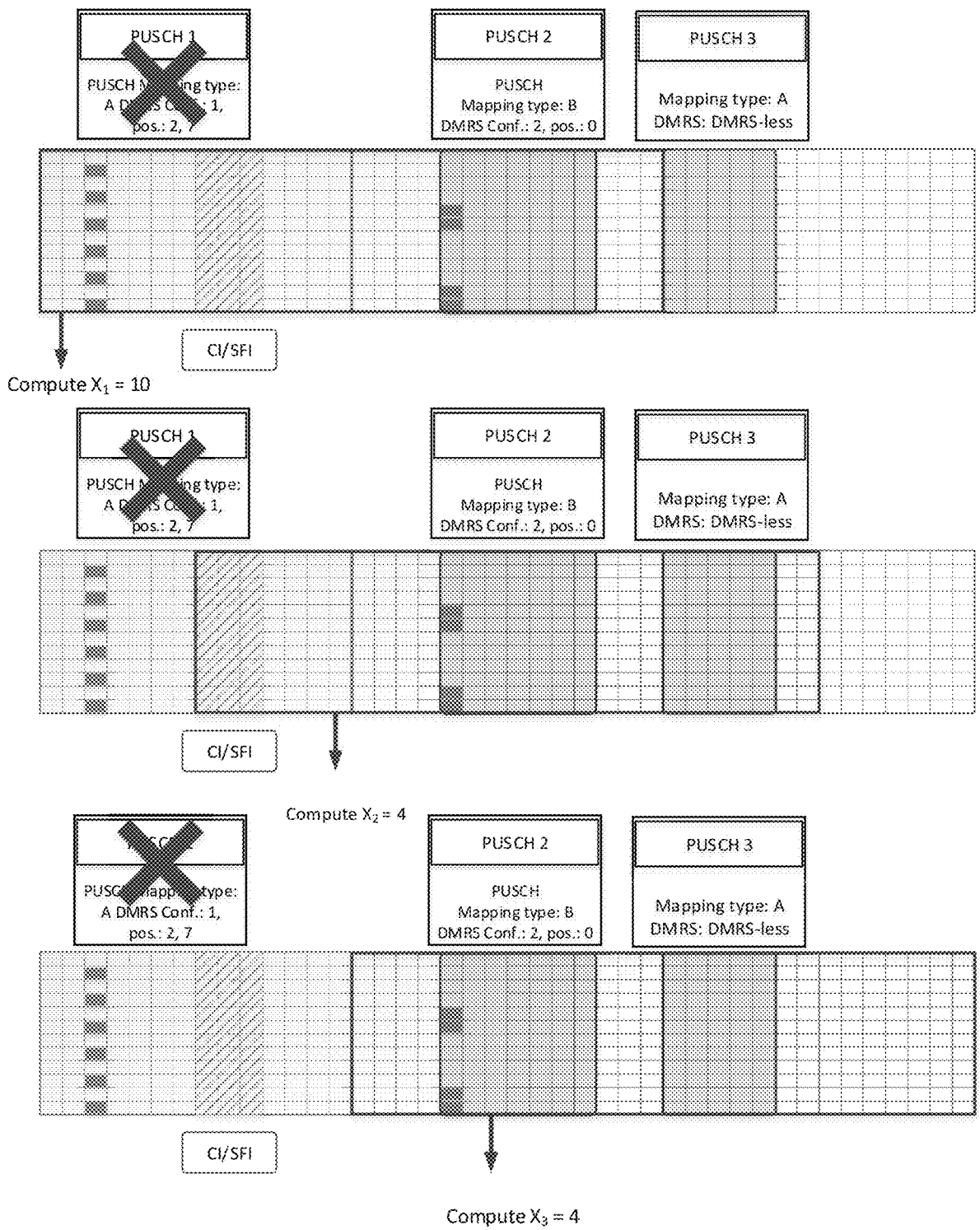
FIG. 20 illustrates a method of computing values of DMRS intermediate values, according to an embodiment.

Following the example illustrated in FIG. 14, if the time/frequency range for DMRS intermediate value computation is two slots and one RB, and mechanism 1 is used with an overlapping of time/frequency range of half of a slot, by assuming that $X_i$ corresponds to the total number of REs within the time/frequency range, then the resultant values of $X_i$ are $X_1=10$, $X_2=4$, and $X_3=4$, as shown in FIG. 20.

FIG. 20 illustrates a method of computing values of DMRS intermediate values, according to an embodiment.

The time/frequency range used for computing DMRS intermediate values, along with the way of computing $X_i$, can be RRC configured. The time/frequency range may be understood as a range on which all REs will have acceptable channel estimation quality using the same set of DMRS resources by assuming channel values within the range are reasonably correlated. Noting the time-varying nature of the channel, it may also be useful to dynamically indicate the time/frequency range and the way of computing $X_i$ to the UE.

Mechanism 2: another way of determining the time/frequency ranges to compute $X_i$ is to consider only ranges that include PUSCH REs. Namely, for a particular size of a time/frequency range, a particular range is considered if it includes all REs of a PUSCH.

Figure 21:
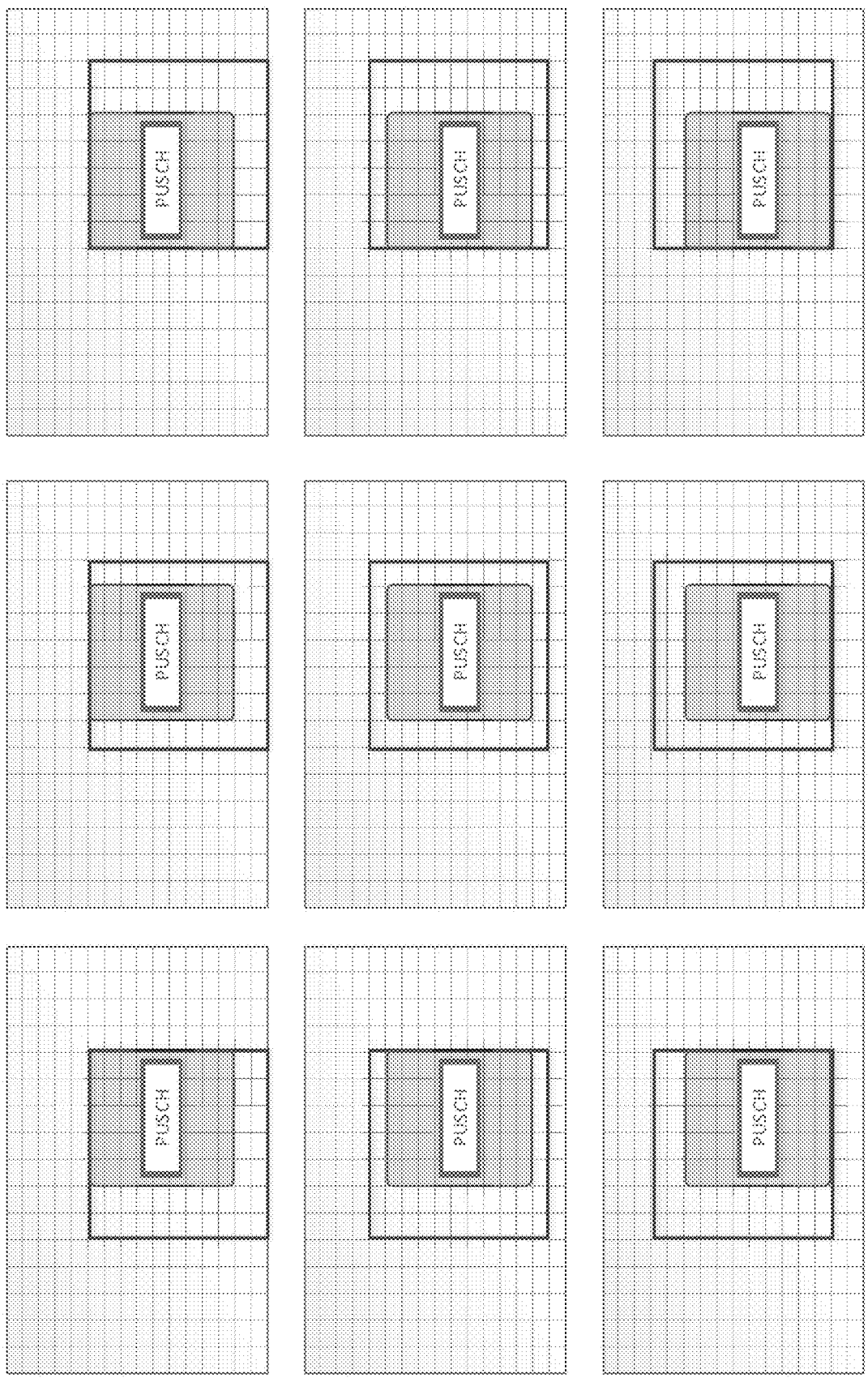
FIG. 21 illustrates a method of determining a time/frequency range based on PUSCH REs, according to an embodiment.

FIG. 21 illustrates a method of determining a time/frequency range based on PUSCH REs, according to an embodiment. More specifically, FIG. 21 shows how the time/frequency range determination works based on PUSCH REs.

Referring again to FIG. 15, in step 1505, the gNB and/or the UE determines whether/which other PUSCHs are cancelled as a consequence of the cancelled DMRS resources due to CI/SFI. The cancellation performed here is in anticipation to the degradation in channel estimation quality of the PUSCHs and the low likelihood of successful decoding of these PUSCHs. The decision to cancel can be based on the DMRS intermediate values computed in the previous step. For example, in step 1505, the cancellation decisions may be made based on the obtained DMRS intermediate values $X_i$.

A cancellation decision may also be based on there not being enough DMRS resources are available for channel estimation of particular REs. For example, for a given RE r, the channel estimation for r in a bundled PUSCH operation depends on nearby DMRS resources. The amount of "nearby" DMRS resources can be inferred from the values of DMRS intermediate values $X_i$ for which the time/frequency range includes r. Here, $\mathcal{X}(r)$ is the set of such DMRS intermediate values $X_i$. Therefore, the expected channel quality for r can be based on the DMRS intermediate values in $\mathcal{X}(r)$.

If the set $\mathcal{X}(r)$ includes only one DMRS intermediate value $X_i$ (e.g., the process of DMRS intermediate value computation uses non-overlapping time/frequency ranges), then the expected channel estimation quality for r, q(r), can be determined as follows:

$$\text{If } X_i \geq \gamma, \text{ then } q(r) \text{ is high, else } q(r) \text{ is low}$$

Note that $\gamma$ can be an absolute value or a function of the original DMRS intermediate value prior to cancellation due to CI/SFI. The value and interpretation of $\gamma$ can be RRC configured or dynamically indicated.

If the set $\mathcal{X}(r)$ includes more than one DMRS intermediate value $X_i$, then two variations of the decision rule may be utilized.

Variation 1: the first variation uses the aforementioned decision rule, while replacing the value of $X_i$ with a particular function of the available DMRS intermediate values in $\mathcal{X}(r)$:

$$\text{If } \Phi(\mathcal{X}(r)) \geq \gamma, \text{ then } q(r) \text{ is high, else } q(r) \text{ is low}$$

The function $\Phi(\mathcal{X}(r))$ can be the maximum, the minimum, or the average of the DMRS intermediate values in $\mathcal{X}(r)$.

Variation 2: the second variation makes a quality decision q(r) on the RE r based on each DMRS intermediate value in $\mathcal{X}(r)$. Then a collective decision on the channel estimation quality for r can be determined based on the individual values of q(r). The collective decision can be, for example, based on a majority vote, or be high if a certain number/fraction of q(r) reports a high quality.

After making quality decisions q(r) on each RE, a decision can be made regarding whether to cancel a PUSCH. Namely, a PUSCH can be cancelled if a particular number/fraction of the constituent REs report a low channel estimation quality. This number/fraction can be RRC configured or dynamically indicated.

Figure 22:
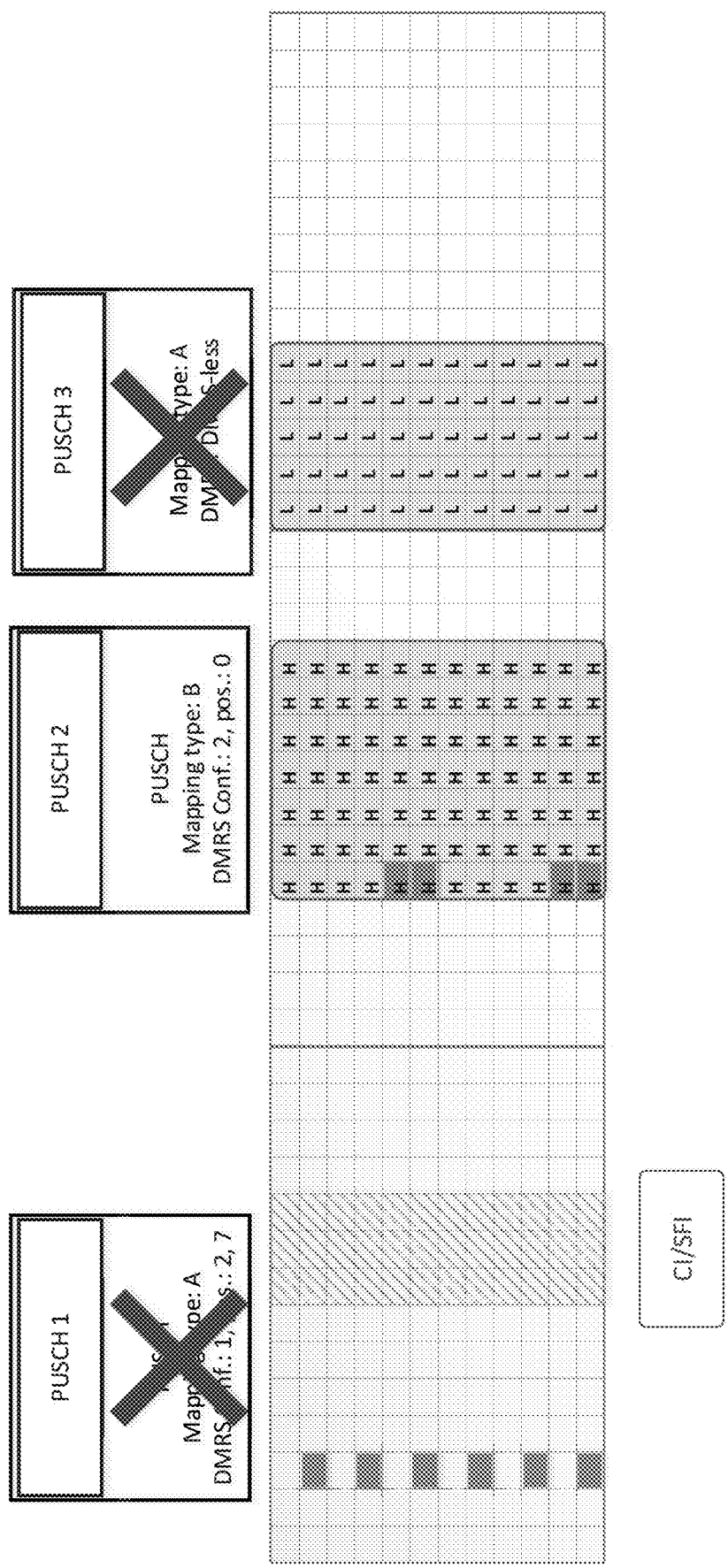
FIG. 22 illustrates an example of a final decision to cancel/keep bundled PUSCHs, according to an embodiment.

Using the example in FIG. 14 again, if Variation 1 is adopted with the function $\Phi(\mathcal{X}(r))$ being the maximum and $\gamma=5$, the final decision would be to cancel PUSCH 3 and keep PUSCH 2 as illustrated in FIG. 22.

FIG. 22 illustrates an example of a final decision to cancel/keep bundled PUSCHs, according to an embodiment.

A special case of Embodiment 2A includes using the notion of a bundling unit.

More specifically, selecting the time/frequency range to be a total amount of time/frequency resources in which bundled PUSCHs are configured results in only one time/frequency range for the computation of $X_i$. In this case, one value of $X_i$ is used to make a quality estimate q(r) for all REs. Therefore, the decision on the channel estimation quality is a direct decision on whether to keep/cancel the remaining PUSCH transmissions in the bundled PUSCHs. This variation is a simple procedure to execute, although it may not be the most accurate in assessing the expected decoding performance of PUSCHs, consequently making too aggressive or too relaxed cancellation decisions.

One option is considering $\gamma=1$, i.e., make a decision to transmit all bundled PUSCHs if there is at least one DMRS resource available. Here, resources, i.e., $X_i$, can be in terms of the total number of DMRS REs or in terms of DMRS OFDM symbols. This option allows for deciding to transmit remaining PUSCHs in the group of bundled PUSCHs, if there is at least one DMRS resource available.

As described above, the embodiments of the disclosure provide a framework in NR, which allows DMRS bundling to be performed among a set of PUSCHs, thereby increasing coverage/decodability of TBs transmitted onto PUSCHs with bundled DMRS resources.

Figure 23:
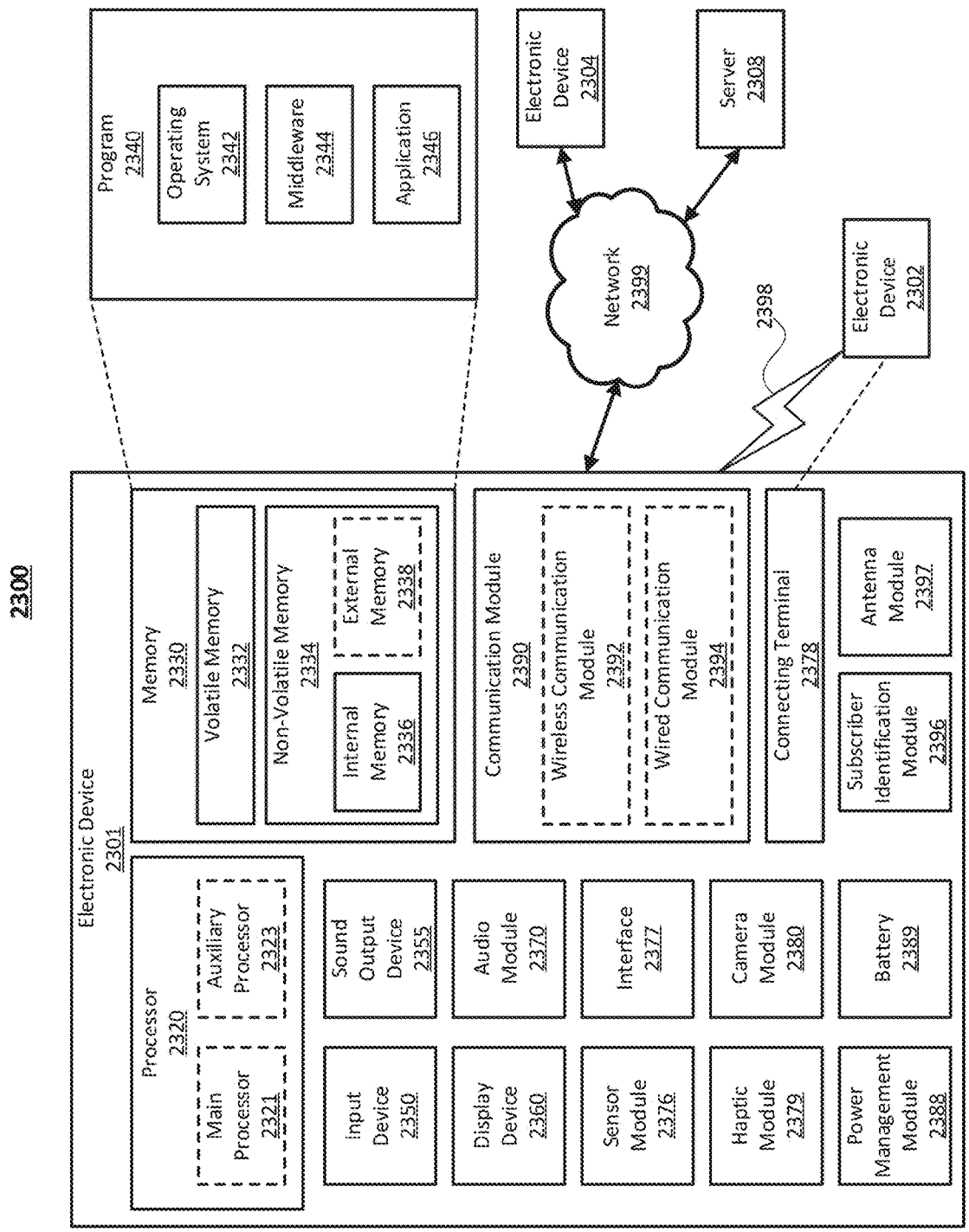
FIG. 23 illustrates an electronic device in a network environment, according to an embodiment.

FIG. 23 illustrates an electronic device in a network environment, according to an embodiment.

Referring to FIG. 23, the electronic device 2301, e.g., a mobile terminal including GPS functionality, in the network environment 2300 may communicate with an electronic device 2302 via a first network 2398 (e.g., a short-range wireless communication network), or an electronic device 2304 or a server 2308 via a second network 2399 (e.g., a long-range wireless communication network). The electronic device 2301 may communicate with the electronic device 2304 via the server 2308. The electronic device 2301 may include a processor 2320, a memory 2330, an input device 2350, a sound output device 2355, a display device 2360, an audio module 2370, a sensor module 2376, an interface 2377, a haptic module 2379, a camera module 2380, a power management module 2388, a battery 2389, a communication module 2390, a subscriber identification module (SIM) 2396, or an antenna module 2397 including a GNSS antenna. In one embodiment, at least one (e.g., the display device 2360 or the camera module 2380) of the components may be omitted from the electronic device 2301, or one or more other components may be added to the electronic device 2301. In one embodiment, some of the components may be implemented as a single integrated circuit (IC). For example, the sensor module 2376 (e.g., a fingerprint sensor, an iris sensor, or an illuminance sensor) may be embedded in the display device 2360 (e.g., a display).

The processor 2320 may execute, for example, software (e.g., a program 2340) to control at least one other component (e.g., a hardware or a software component) of the electronic device 2301 coupled with the processor 2320, and may perform various data processing or computations. As at least part of the data processing or computations, the processor 2320 may load a command or data received from another component (e.g., the sensor module 2376 or the communication module 2390) in volatile memory 2332, process the command or the data stored in the volatile memory 2332, and store resulting data in non-volatile memory 2334. The processor 2320 may include a main processor 2321 (e.g., a central processing unit (CPU) or an application processor, and an auxiliary processor 2323 (e.g., a graphics processing unit (GPU), an image signal processor (ISP), a sensor hub processor, or a communication processor (CP)) that is operable independently from, or in conjunction with, the main processor 2321. Additionally or alternatively, the auxiliary processor 2323 may be adapted to consume less power than the main processor 2321, or execute a particular function. The auxiliary processor 2323 may be implemented as being separate from, or a part of, the main processor 2321.

The auxiliary processor 2323 may control at least some of the functions or states related to at least one component (e.g., the display device 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to one embodiment, the auxiliary processor 2323 (e.g., an image signal processor or a communication processor) may be implemented as part of another component (e.g., the camera module 2380 or the communication module 2390) functionally related to the auxiliary processor 2323.

The memory 2330 may store various data used by at least one component (e.g., the processor 2320 or the sensor module 2376) of the electronic device 2301. The various data may include, for example, software (e.g., the program 2340) and input data or output data for a command related thereto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input device 2350 may receive a command or data to be used by other component (e.g., the processor 2320) of the electronic device 2301, from the outside (e.g., a user) of the electronic device 2301. The input device 2350 may include, for example, a microphone, a mouse, or a keyboard.

The sound output device 2355 may output sound signals to the outside of the electronic device 2301. The sound output device 2355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 2360 may visually provide information to the outside (e.g., a user) of the electronic device 2301. The display device 2360 may include, for example, a display, a hologram device, or a projector and control circuitry to control a corresponding one of the display, hologram device, and projector. According to one embodiment, the display device 2360 may include touch circuitry adapted to detect a touch, or sensor circuitry (e.g., a pressure sensor) adapted to measure the intensity of force incurred by the touch.

The audio module 2370 may convert a sound into an electrical signal and vice versa. According to one embodiment, the audio module 2370 may obtain the sound via the input device 2350, or output the sound via the sound output device 2355 or a headphone of an external electronic device 2302 directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. The sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device 2302 directly (e.g., wiredly) or wirelessly. According to one embodiment, the interface 2377 may include, for example, a high definition multimedia interface (HDMI), a universal serial bus (USB) interface, a secure digital (SD) card interface, or an audio interface.

A connecting terminal 2378 may include a connector via which the electronic device 2301 may be physically connected with the external electronic device 2302. According to one embodiment, the connecting terminal 2378 may include, for example, an HDMI connector, a USB connector, an SD card connector, or an audio connector (e.g., a headphone connector).

The haptic module 2379 may convert an electrical signal into a mechanical stimulus (e.g., a vibration or a movement) or an electrical stimulus which may be recognized by a user via tactile sensation or kinesthetic sensation. According to one embodiment, the haptic module 2379 may include, for example, a motor, a piezoelectric element, or an electrical stimulator.

The camera module 2380 may capture a still image or moving images. According to one embodiment, the camera module 2380 may include one or more lenses, image sensors, image signal processors, or flashes.

The power management module 2388 may manage power supplied to the electronic device 2301. The power management module 2388 may be implemented as at least part of, for example, a power management integrated circuit (PMIC).

The battery 2389 may supply power to at least one component of the electronic device 2301. According to one embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the electronic device 2302, the electronic device 2304, or the server 2308) and performing communication via the established communication channel. The communication module 2390 may include one or more communication processors that are operable independently from the processor 2320 (e.g., the application processor) and supports a direct (e.g., wired) communication or a wireless communication. According to one embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or a standard of the Infrared Data Association (IrDA)) or the second network 2399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The antenna module 2397 may transmit or receive a signal or power to or from the outside (e.g., the external electronic device) of the electronic device 2301. According to one embodiment, the antenna module 2397 may include one or more antennas, and, therefrom, at least one antenna appropriate for a communication scheme used in the communication network, such as the first network 2398 or the second network 2399, may be selected, for example, by the communication module 2390 (e.g., the wireless communication module 2392). The signal or the power may then be transmitted or received between the communication module 2390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 2301 and the external electronic device 2304 via the server 2308 coupled with the second network 2399. Each of the electronic devices 2302 and 2304 may be a device of a same type as, or a different type, from the electronic device 2301. All or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, or client-server computing technology may be used, for example.

One embodiment may be implemented as software (e.g., the program 2340) including one or more instructions that are stored in a storage medium (e.g., internal memory 2336 or external memory 2338) that is readable by a machine (e.g., the electronic device 2301). For example, a processor of the electronic device 2301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, performed by a user equipment (UE), for configured grant (CG) type 1 (CG1)-physical uplink shared channel (PUSCH) transmission, the method comprising:
    receiving, via a radio resource control (RRC) configuration, an indication of one or more CG1-PUSCH transmissions for demodulation reference signals (DMRS) bundling;
    determining, based on a sounding reference signal (SRS) resource indicator (SRI), a precoding matrix for a CG1-PUSCH transmission;
    processing a DMRS using the determined precoding matrix;
    transmitting the processed DMRS across bundled DMRS resources of a set of CG1-PUSCHs, based on the indication; and
    maintaining a same transmission power across the bundled DMRS resources,
    wherein the indication includes a duration in terms of slots or in terms of PUSCHs over which to perform the DMRS bundling, a number of CG1-PUSCHs, a periodicity, and a bundling unit duration in which the duration is contained, and
    wherein maintaining the same transmission power across the bundled DMRS resources comprises setting the transmission power to be used across all of the CG1-PUSCHs based on a path loss (PL) value.

2. The method of claim 1, wherein determining the precoding matrix comprises identifying a precoding matrix corresponding to a latest SRS resource with an SRI matching those configured for the CG1-PUSCHs.

3. The method of claim 1, further comprising estimating the PL value using a latest reference signal received by the UE before the CG1-PUSCHs.

4. The method of claim 1, wherein the same transmission power is maintained across the bundled DMRS resources in response to receiving a same transmit power control (TPC) value for all of the CG1-PUSCHs.

5. The method of claim 1, wherein maintaining the same transmission power across the bundled DMRS resources comprises ignoring transmit power control (TPC) commands that are not received in a particular format.

6. The method of claim 1, wherein maintaining the same transmission power across the bundled DMRS resources comprises assuming the same PL value for all of the CG1-PUSCHs that do not have reference signals for estimating PL.

7. The method of claim 1, further comprising refraining from transmitting SRS and CSI-RS resources during a quiet period during a bundling duration.

8. The method of claim 1, further comprising refraining from transmitting SRS and CSI-RS resources during a reduced quiet period during a bundling duration,
    wherein the reduced quiet period is shorter than the bundling duration.

9. The method of claim 1, further comprising:
    receiving a cancelation indication, while transmitting the processed DMRS across the bundled DMRS resources of the set of the CG1-PUSCHs;
    determining remaining resources to transmit among the set of the set of the CG1-PUSCHs;
    determining a set of DMRS intermediate values based on the remaining resources; and
    determining which of the remaining resources will be transmitted or cancelled, based on the intermediate DMRS values.

10. The method of claim 1, wherein the bundled DMRS resources are included in a bundling unit of consecutive resource elements (REs), where any DMRS resource in the bundling unit may be used for channel estimation of any other RE in the bundling unit.

11. A user equipment (UE), comprising:
    a transceiver; and
    a processor configured to:
        receive, via a radio resource control (RRC) configuration, an indication of one or more CG1-PUSCH transmissions for demodulation reference signals (DMRS) bundling,
        determine, based on a sounding reference signal (SRS) resource indicator (SRI), a precoding matrix for a configured grant (CG) type 1 (CG1)-physical uplink shared channel (PUSCH) transmission,
        process a DMRS using the determined precoding matrix, transmit, via the transceiver, the processed DMRS across bundled DMRS resources of a set of CG1-PUSCHs, based on the indication, and maintain a same transmission power across the bundled DMRS resources, wherein the indication includes a duration in terms of slots or in terms of PUSCHs over which to perform the DMRS bundling, a number of CG1-PUSCHs, a periodicity, and a bundling unit duration in which the duration is contained, and wherein maintaining the same transmission power across the bundled DMRS resources comprises setting the transmission power to be used across all of the CG1-PUSCHs based on a path loss (PL) value.

12. A method, performed by a Node B, for receiving a configured grant (CG) type 1 (CG1)-physical uplink shared channel (PUSCH) transmission from a user equipment (UE), the method comprising:

transmitting, via a radio resource control (RRC) configuration, an indication of one or more CG1-PUSCH transmissions for demodulation reference signals (DMRS) bundling;

transmitting a sounding reference signal (SRS) resource indicator (SRI) to the UE, wherein the UE determines a precoding matrix for a CG1-PUSCH transmission based on the SRI; and receiving, from the UE, a demodulation reference signals (DMRS) across bundled DMRS resources of a set of CG1-PUSCHs, based on the indication, wherein the DMRS is processed by the UE using the determined precoding matrix, wherein the indication includes a duration in terms of slots or in terms of PUSCHs over which to perform the DMRS bundling, a number of CG1-PUSCHs, a periodicity, and a bundling unit duration in which the duration is contained, and wherein a same transmission power is maintained across the bundled DMRS resources by setting the transmission power to be used across all of the CG1-PUSCHs based on a path loss (PL) value.

* * * * *